United States Patent
Kare et al.

(10) Patent No.: US 10,358,945 B2
(45) Date of Patent: Jul. 23, 2019

(54) HEAT ENGINE SYSTEM

(71) Applicant: Elwha LLC, Bellvue, WA (US)

(72) Inventors: Jordin T. Kare, San Jose, CA (US); Nathan P. Myhrvold, Medina, WA (US); Robert C. Petroski, Seattle, WA (US); Lowell L. Wood, Jr., Bellevue, WA (US)

(73) Assignee: Elwha LLC, Bellvue, WA (US)

( * ) Notice: Subject to any disclaimer, the term of this patent is extended or adjusted under 35 U.S.C. 154(b) by 685 days.

(21) Appl. No.: 15/064,730

(22) Filed: Mar. 9, 2016

(65) Prior Publication Data
US 2016/0186615 A1 Jun. 30, 2016

Related U.S. Application Data

(63) Continuation of application No. 13/724,567, filed on Dec. 21, 2012, now Pat. No. 9,404,392, which is a
(Continued)

(51) Int. Cl.
*H02K 7/18* (2006.01)
*F01D 15/10* (2006.01)
(Continued)

(52) U.S. Cl.
CPC ............. *F01K 11/00* (2013.01); *F01D 15/10* (2013.01); *F01K 11/02* (2013.01); *F01K 13/00* (2013.01);
(Continued)

(58) Field of Classification Search
CPC ........ F28D 15/046; F28D 15/02; F01K 25/12; F01K 25/08; F01K 23/00; F01K 13/00; F01K 11/00; F01K 11/02; F01D 15/10
(Continued)

(56) References Cited

U.S. PATENT DOCUMENTS 2,227,129 A 12/1940 Entz
2,350,348 A * 6/1944 Gaugler ............... F25D 11/025
174/15.2
(Continued)

FOREIGN PATENT DOCUMENTS

CN 2879090 Y 3/2007
WO WO0244639 A1 6/2002

OTHER PUBLICATIONS

Clark, Richard; "New drive system takes gears out of the equation"; Industrial Technology—Drives & Controls Direct Drive Motors; Jun. 2009; p. 26.
(Continued)

*Primary Examiner* — J. Todd Newton

(57) ABSTRACT

An improved heat engine includes at least one heat pipe containing a working fluid flowing in a thermal cycle between vapor phase at an evaporator end and liquid phase at a condenser end. The heat pipe may have an improved capillary structure configuration with a continuous or stepwise gradient in pore size along the capillary flow direction. The heat engine may have an improved generator assembly configuration that includes an expander (e.g. rotary/turbine or reciprocating piston machine) and generator along with magnetic bearings, magnetic couplings, and/or magnetic gearing. The expander-generator may be wholly or partially sealed within the heat pipe. A heat engine system (e.g. individual heat engine or array of heat engines in series and/or in parallel) for converting thermal energy to useful work (including heat engines operating from a common heat source) is also disclosed. The system can be installed in a vehicle or facility to generate electricity.

37 Claims, 28 Drawing Sheets

Related U.S. Application Data continuation-in-part of application No. 13/723,754, filed on Dec. 21, 2012, now Pat. No. 9,752,832, which is a continuation-in-part of application No. 13/724,412, filed on Dec. 21, 2012, now abandoned.

(51) Int. Cl.
| | |
|---|---|
| F01K 11/00 | (2006.01) |
| F28D 15/04 | (2006.01) |
| F01K 13/00 | (2006.01) |
| F01K 25/08 | (2006.01) |
| F01K 25/12 | (2006.01) |
| F01K 11/02 | (2006.01) |
| H02K 49/10 | (2006.01) |
| F28D 15/02 | (2006.01) |

(52) U.S. Cl.
CPC .............. F01K 25/08 (2013.01); F01K 25/12 (2013.01); F28D 15/04 (2013.01); F28D 15/043 (2013.01); H02K 7/1823 (2013.01); H02K 49/10 (2013.01); F28D 2015/0291 (2013.01)

(58) Field of Classification Search
USPC .................................. 60/698, 670, 643, 645
See application file for complete search history.

(56) References Cited

U.S. PATENT DOCUMENTS

| | | | |
|---|---|---|---|
| 2,437,871 A | 3/1948 | Wood | |
| 2,707,863 A | 5/1955 | Rhodes | |
| 3,301,091 A | 1/1967 | Reese | |
| 3,305,005 A | 2/1967 | Grover et al. | |
| 3,378,710 A | 4/1968 | Martin, Jr. | |
| 3,455,419 A | 7/1969 | Miguel | |
| 3,579,003 A | 5/1971 | Gray | |
| 3,670,495 A | 6/1972 | Leffert | |
| 3,683,249 A | 8/1972 | Shibata | |
| 3,754,174 A | 8/1973 | Shibata | |
| 3,865,184 A | 2/1975 | Grover | |
| 3,880,230 A | 4/1975 | Pessolano et al. | |
| 3,936,683 A | 2/1976 | Walker | |
| 4,038,572 A | 7/1977 | Hanagan | |
| 4,044,797 A | 8/1977 | Fujie et al. | |
| 4,069,673 A | 1/1978 | Lapeyre | |
| 4,146,508 A | 3/1979 | Fehr et al. | |
| 4,165,614 A | 8/1979 | Yeh | |
| 4,170,262 A * | 10/1979 | Marcus | F28D 15/046 138/40 |
| 4,186,559 A * | 2/1980 | Decker | F01K 9/026 165/104.26 |
| 4,240,257 A * | 12/1980 | Rakowsky | F01K 9/026 165/104.26 |
| 4,341,000 A | 7/1982 | Stockman | |
| 4,351,388 A * | 9/1982 | Calhoun | F28D 15/046 165/104.26 |
| 4,440,215 A | 4/1984 | Grover et al. | |
| 4,546,608 A | 10/1985 | Shiina et al. | |
| 4,994,684 A | 2/1991 | Lauw et al. | |
| 5,054,296 A | 10/1991 | Sotani et al. | |
| 5,204,572 A | 4/1993 | Ferreira | |
| 5,295,812 A | 3/1994 | Steele | |
| 5,633,555 A | 5/1997 | Ackermann et al. | |
| 5,691,586 A | 11/1997 | Yonnet et al. | |
| 5,751,127 A | 5/1998 | Austin et al. | |
| 6,011,334 A * | 1/2000 | Roland | H02K 7/11 290/43 |
| 6,230,866 B1 | 5/2001 | Link | |
| 6,293,333 B1 | 9/2001 | Ponnappan et al. | |
| 6,382,309 B1 | 5/2002 | Kroliczek et al. | |
| 6,745,825 B1 | 6/2004 | Nakamura et al. | |
| 6,857,269 B2 * | 2/2005 | Baker | B64G 1/506 60/653 |
| 6,895,741 B2 | 5/2005 | Rago et al. | |
| 6,918,254 B2 | 6/2005 | Baker | |
| 6,978,828 B1 | 12/2005 | Gunawardana | |
| 7,443,062 B2 | 10/2008 | Dong et al. | |
| 7,520,315 B2 * | 4/2009 | Hou | F28D 15/0233 165/104.26 |
| 7,791,235 B2 | 9/2010 | Kern et al. | |
| 7,823,374 B2 | 11/2010 | Venkataramani et al. | |
| 7,980,078 B2 * | 7/2011 | McCutchen | F28D 15/0233 60/645 |
| 8,015,788 B2 | 9/2011 | Stephenson et al. | |
| 8,096,121 B2 * | 1/2012 | Gilton | F01K 27/005 60/531 |
| 8,283,613 B2 | 10/2012 | Tain et al. | |
| 8,438,847 B2 | 5/2013 | Chen et al. | |
| 8,484,974 B1 | 7/2013 | Monson et al. | |
| 10,069,442 B2 * | 9/2018 | Chin | H02K 7/1823 |
| 2003/0030986 A1 | 2/2003 | Centola et al. | |
| 2003/0093995 A1 * | 5/2003 | Tadayon | F01K 3/185 60/651 |
| 2003/0136551 A1 | 7/2003 | Bakke | |
| 2004/0021382 A1 | 2/2004 | Steinmeyer | |
| 2004/0021579 A1 | 2/2004 | Oursler et al. | |
| 2004/0245877 A1 | 12/2004 | Khalizadeh | |
| 2005/0061486 A1 | 3/2005 | Yang | |
| 2005/0269065 A1 * | 12/2005 | Chen | B82Y 10/00 165/104.26 |
| 2006/0016580 A1 | 1/2006 | Lee et al. | |
| 2006/0162907 A1 * | 7/2006 | Wu | F28D 15/046 165/104.26 |
| 2006/0175044 A1 | 8/2006 | Lee et al. | |
| 2006/0213061 A1 | 9/2006 | Wu et al. | |
| 2006/0219391 A1 * | 10/2006 | Hong | F28D 15/046 165/104.26 |
| 2006/0231235 A1 | 10/2006 | Yamanaka et al. | |
| 2007/0084587 A1 * | 4/2007 | Huang | B22F 5/106 165/104.26 |
| 2007/0151969 A1 * | 7/2007 | Tain | F01K 13/006 219/631 |
| 2007/0204975 A1 | 9/2007 | Liu et al. | |
| 2007/0240855 A1 | 10/2007 | Hou et al. | |
| 2007/0240856 A1 * | 10/2007 | Liu | F28D 15/0233 165/104.26 |
| 2007/0240858 A1 * | 10/2007 | Hou | F28D 15/046 165/104.26 |
| 2007/0251673 A1 * | 11/2007 | Hou | F28D 15/046 165/104.26 |
| 2008/0178589 A1 * | 7/2008 | He | F03D 9/007 60/531 |
| 2008/0199310 A1 | 8/2008 | Nomura et al. | |
| 2008/0236794 A1 * | 10/2008 | St. Louis | H01L 23/473 165/104.19 |
| 2009/0056917 A1 | 3/2009 | Majumdar et al. | |
| 2009/0071633 A1 * | 3/2009 | He | F28D 15/0233 165/104.26 |
| 2010/0162969 A1 | 7/2010 | Tain et al. | |
| 2010/0162970 A1 * | 7/2010 | Chen | C25B 1/04 123/3 |
| 2010/0289361 A1 | 11/2010 | Kamio | |
| 2011/0079007 A1 | 4/2011 | Gouko et al. | |
| 2011/0120451 A1 | 5/2011 | Miles | |
| 2011/0162362 A1 | 7/2011 | Steiner | |
| 2011/0289922 A1 | 12/2011 | Myers et al. | |
| 2011/0297269 A1 * | 12/2011 | Pilon | B22F 5/106 138/141 |
| 2012/0048517 A1 | 3/2012 | Huang et al. | |
| 2012/0144829 A1 | 6/2012 | Wiggs et al. | |
| 2012/0227934 A1 | 9/2012 | Huang | |
| 2013/0049040 A1 | 2/2013 | Ramer et al. | |
| 2013/0049367 A1 | 2/2013 | Adachi et al. | |
| 2013/0205773 A1 | 8/2013 | Persson et al. | |
| 2014/0174085 A1 * | 6/2014 | Kare | F01K 11/00 60/670 |

(56) References Cited

U.S. PATENT DOCUMENTS

| | | | | |
|---|---|---|---|---|
| 2014/0174086 A1* | 6/2014 | Kare | ................. | F01K 11/00 60/670 |
| 2014/0174701 A1* | 6/2014 | Kare | ................. | F28D 15/04 165/104.26 |
| 2014/0353971 A1 | 12/2014 | Davey | | |

OTHER PUBLICATIONS

Evans, Joe; "Magnetic Couplings—An Investment that Can Provide Multiple Returns"; Pumps & Systems—Pump Ed 101; Dec. 2009; pp. 12-13.

Ginet et al.; "The Turbogenerator—A Continuous Engineering Challenge"; created on Apr. 16, 2007; pp. 1-6; Alstom.com.

Li et al.; "Evaporation/Boiling in Thin Capillary Wicks (II)—Effects of Volumetric Porosity and Mesh Size"; Journal of Heat Transfer Transactions of the ASME; Dec. 2006; pp. 1320-1328; vol. 128; ASME.

Magnomatics Limited; "No More Gears, Our Products, Markets, Services"; located at www.Magnomatics.com; Mar. 17, 2010; pp. 1-4.

Metau Engineering; "Permanent Magnetic Couplings"; GMDO Permanent Magnetic Coupling; bearing a date of Nov. 2008; pp. 1-10; Metau Engineering srl.

Nouri-Borujerdi et al.; "A Review of Concentric Annular Heat Pipes"; Heat Transfer Engineering; 2005; pp. 45-58; vol. 26; No. 6; Taylor and Francis Inc.

PCT International Search Report; International App. No. PCT/US2013/075444; dated Mar. 26, 2014; pp. 1-4.

Ranjan et al.; "Assessment of Nanostructured Capillary Wicks for Passive, Two-Phase Heat Transport"; Nanoscale and Microscale Thermophysical Engineering; bearing dates of Jul. 22, 2010, Dec. 31, 2011 and Jun. 12, 2011; pp. 179-194; vol. 15; Taylor & Francis Group, LLC.

* cited by examiner

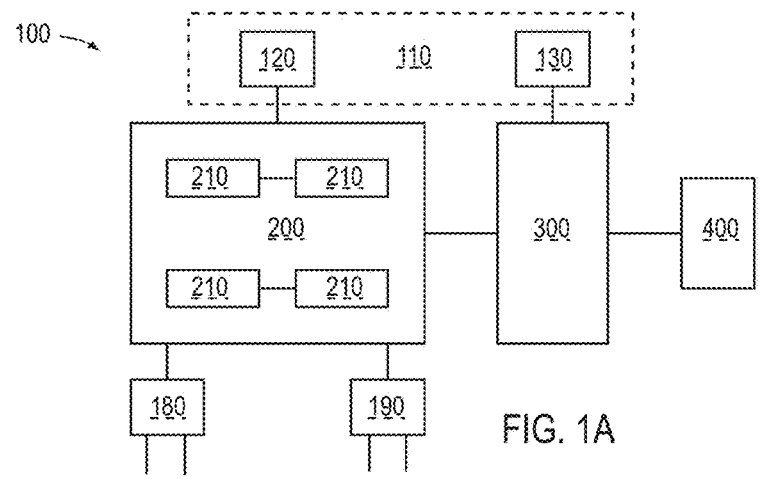
FIG. 1A
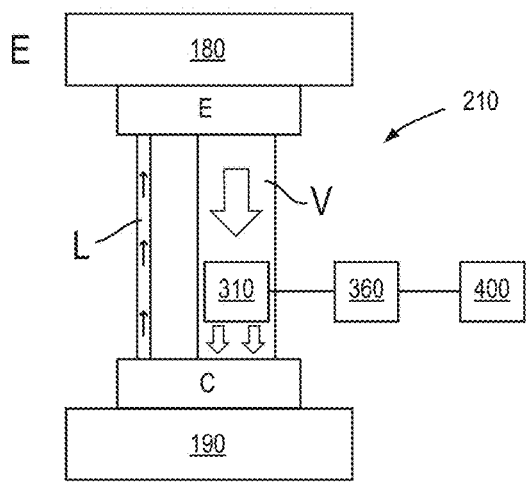
FIG. 1B
FIG. 1C
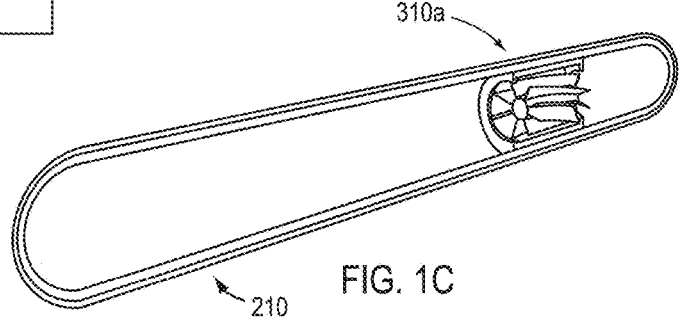
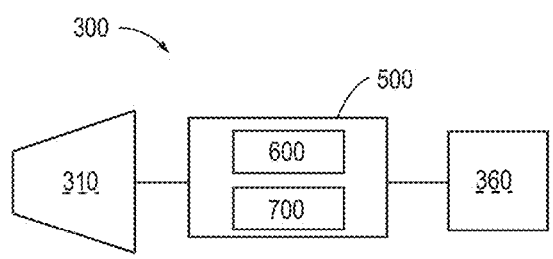
FIG. 1D

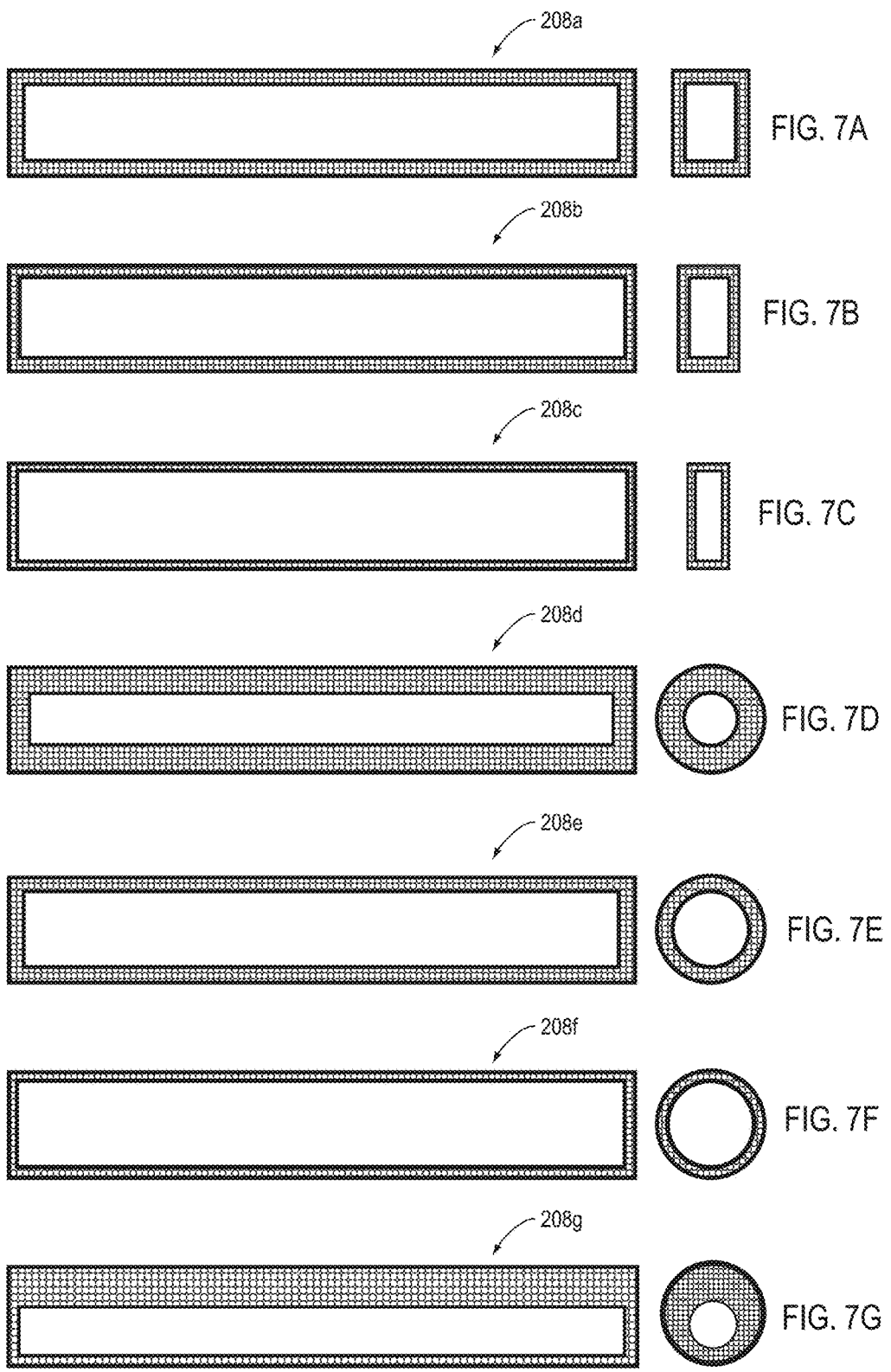

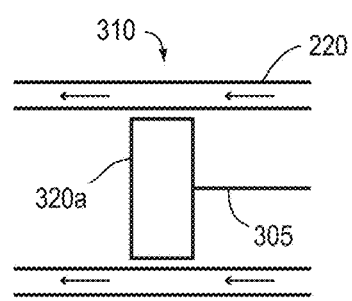
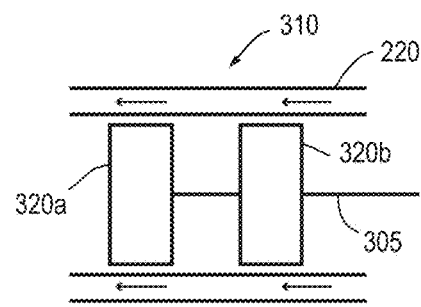
FIG. 17A　　　　　FIG. 17B
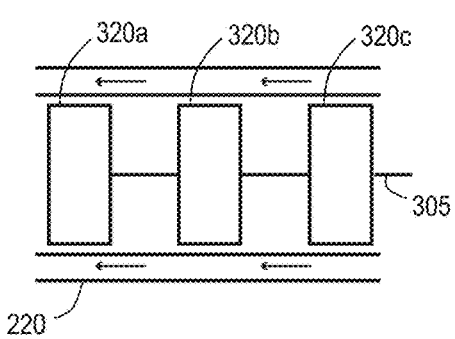
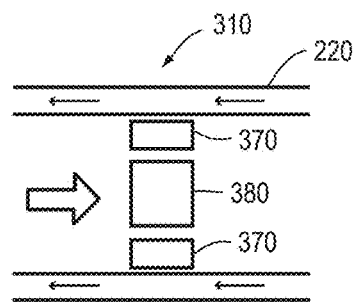
FIG. 17C　　　　　FIG. 17D
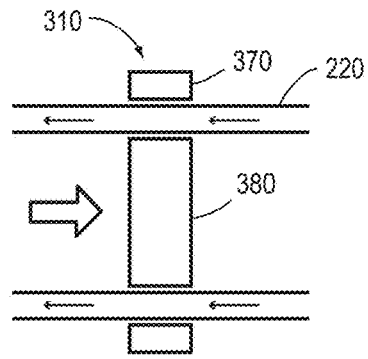
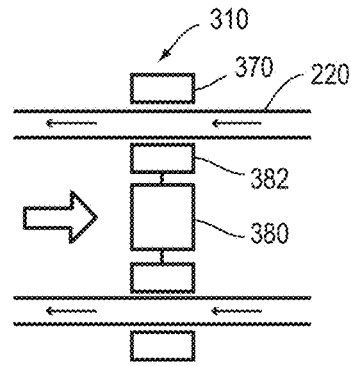
FIG. 17E　　　　　FIG. 17F
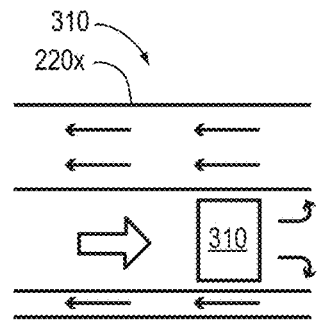
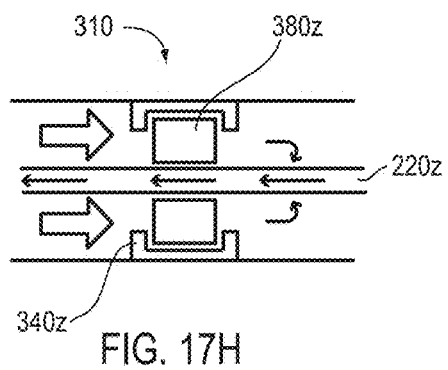
FIG. 17G　　　　　FIG. 17H

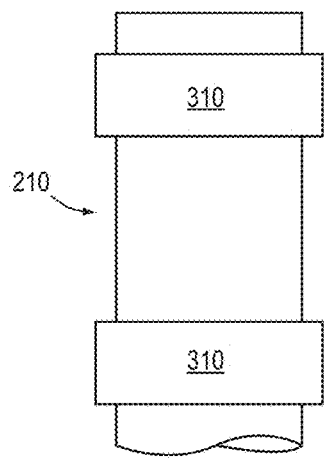 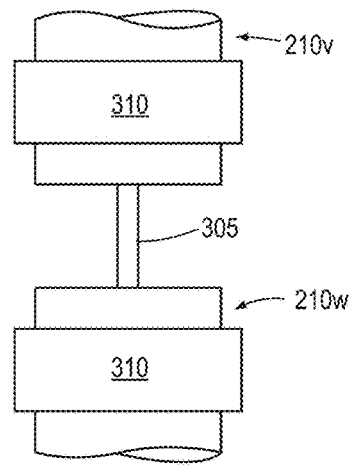
FIG. 24A  FIG. 24B
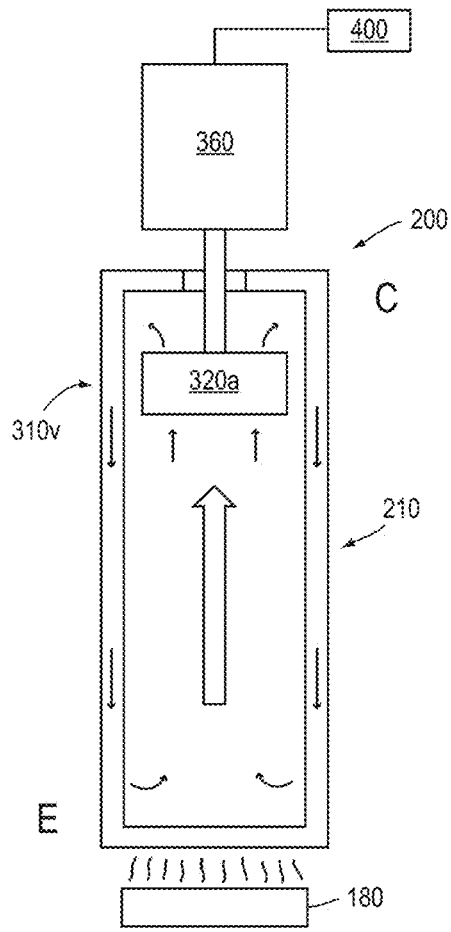 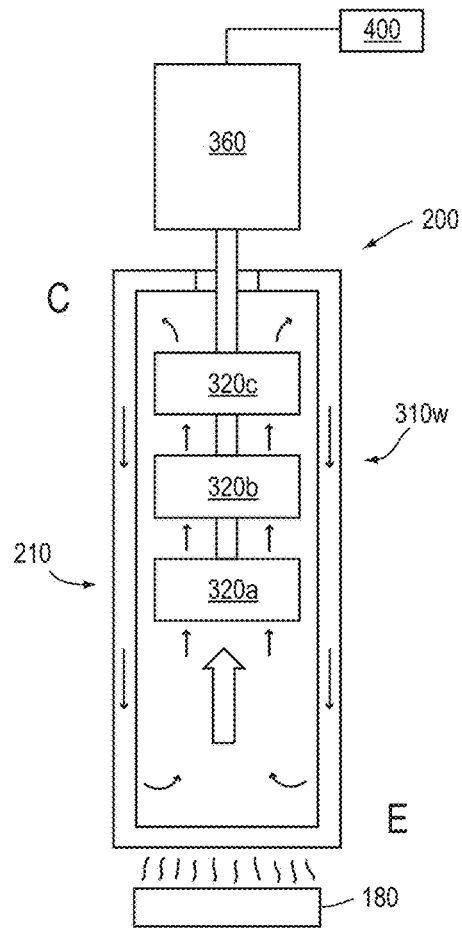
FIG. 25A  FIG. 25B

HEAT ENGINE SYSTEM

The present application constitutes a continuation of U.S. patent application Ser. No. 13/724,567, entitled HEAT ENGINE SYSTEM, naming JORDIN T. KARE, NATHAN P. MYHRVOLD, ROBERT C. PETROSKI, AND LOWELL L. WOOD, JR. as inventors, filed 21 Dec. 2012, which is currently co-pending or is an application of which a currently co-pending application is entitled to the benefit of the filing date.

RELATED APPLICATIONS

U.S. patent application Ser. No. 13/723,754 entitled HEAT PIPE, filed 21 Dec. 2012, is related to the present application which is herein incorporated by reference in its entirety.

U.S. patent application Ser. No. 13/724,412 entitled HEAT ENGINE, filed 21 Dec. 2012, is related to the present application which is herein incorporated by reference in its entirety.

FIELD

The present invention relates to a heat pipe with a capillary structure. The present invention also relates to a heat engine with a capillary-pumped heat pipe. The present invention further relates to a heat engine with a generator. The present invention further relates to an improved-performance heat engine system.

BACKGROUND

A heat pipe configuration employing a working fluid in a phase-change thermal cycle to facilitate heat transfer between an evaporator section at one end (where the working fluid is heated to the vapor phase) and a condenser section at the other end (where the working fluid is condensed to the liquid phase) is known. Known heat pipe configurations provide a passage for flow of the vapor phase working fluid from the evaporator section to the condenser section and a passage for flow of the liquid phase working fluid from the condenser section to the evaporator section in a cycle. Such known heat pipe configurations operate in a generally continuous thermal cycle, absorbing heat from a heat source at the evaporator end where the working fluid is heated to vapor phase and rejecting heat at the condenser end where the working fluid is condensed to liquid phase.

It is known to provide a heat pipe in a generally cylindrical form having an exterior shell or wall; the interior of such known heat pipes will typically include for flow of the vapor phase fluid a centralized axial internal passage (for flow from evaporator to condenser) and for flow of the liquid phase fluid an annular or ring-shaped capillary or wick structure (for flow from condenser to evaporator). The central passage and capillary structure together provide the flow circuit for the working fluid during the continuous thermal cycle of operation for the conventional heat pipe.

It is known that within such a heat pipe a pressure differential is developed in the working fluid between the evaporator section (with the working fluid at higher pressure) and the condenser section (with the working fluid at lower pressure); the flow of the (higher pressure) vapor phase working fluid can be directed to perform useful work. It has been disclosed that a heat pipe may be configured to include an internal gas turbine (powered by flow of the vapor phase working fluid) coupled to a generator; such a heat pipe with turbine and generator may be used to produce electricity (i.e. electric power).

However, notwithstanding such known heat pipe configurations, there has not been widespread successful commercial and industrial application of heat pipe configurations for power generation.

SUMMARY

It would be advantageous to provide for an improved heat pipe configuration modified to achieve enhanced efficiency of operation to perform useful work (e.g. for power generation) in commercial and industrial applications. For example, it would be advantageous to provide for a capillary-pumped heat pipe configuration that has an enhanced capillary structure so that the heat pipe can operate with a higher pressure differential and higher temperature differential between the evaporator section and the condenser section and realize improved efficiency in operation (by extracting more power from the working fluid).

It would also be advantageous to provide for a heat engine that employs an improved heat pipe configuration and/or other design modifications that use and integrate technology enhancements to achieve improved performance and efficiency in operation. For example, it would be advantageous to provide for a heat engine that employs a capillary-pumped heat pipe configuration with an enhanced capillary structure. It would be advantageous to provide for a heat engine that employs an improved expander-generator configuration able to operate at higher pressure and higher speeds (e.g. higher rotational speed) to achieve higher performance, for example, through the use of a magnetic bearing system and/or magnetic coupling system. It would be advantageous to provide for a heat engine that has an integrated sealed construction (e.g. by using a magnetic coupling system rather than a mechanical coupling for transmission of rotational energy and torque) and/or modular construction to provide greater ease of installation and use and enhanced reliability.

It would further be advantageous to provide for a heat engine system that comprises one or more heat engines employing a heat pipe configured for improved efficiency and performance in operation. For example, it would be advantageous to provide for a heat engine system that uses a high-efficiency capillary-pumped heat pipe configuration. It would be advantageous to provide for a heat engine system that comprises an array of heat engines configured to use a common heat source and/or to generate electric power that can be delivered through a common outlet (e.g. shared bus). It would be advantageous to have a heat engine system comprising a heat engine array (e.g. using heat engines having a modular design) that can be configured use for in a wide variety of applications, including commercial, industrial, residential, consumer and other applications.

The present application relates to improved heat pipe configurations, to improved heat engine configurations, and to heat engine system configurations that can be used in a wide variety of applications including electric power generation.

The present invention also relates to improved configurations for capillary-pumped (i.e., "heat pipe") heat engines, particularly including heat pipe heat engines comprising nanofabricated capillary structures (wicks) with characteristic capillary pore sizes between $1\mu$ and 1 nm, and with capillary structures having continuous or stepwise gradients in pore size along the capillary flow direction. Specific geometries for heat-pipe heat engines are disclosed.

The present invention further relates to improved configurations for capillary-pumped turbo-generators, including multistage turbines, magnetically-supported and magnetically-coupled turbines, integrated fully sealed turbo-generators, and magnetically-geared turbo-generators. The invention further relates to capillary-pumped heat engines comprising positive-displacement expanders using non-turbine mechanisms such as screw expanders, reciprocating piston devices, rotary engine configurations, etc.

The present invention further relates to capillary-pumped heat engine systems for conversion of thermal energy to useful work, including in parallel configurations of individual capillary-pumped heat engines, and arrays of heat engines operating from a common heat source.

FIGURES

FIG. 1A is a schematic block diagram of a heat engine system with generator system according to an exemplary embodiment.

FIG. 1B is a schematic block diagram of a heat engine according to an exemplary embodiment.

FIG. 1C is a schematic cross-section perspective view of a heat engine according to an exemplary embodiment.

FIG. 1D is a schematic block diagram of an expander-generator system according to an exemplary embodiment.

FIGS. 7A through 7G are schematic cross-section views of a heat pipe according to an exemplary embodiment.

FIGS. 17A through 17H are schematic diagrams of an expander-generator system for a heat engine according to an exemplary embodiment.

FIG. 24A is a schematic diagram of a heat engine with an expander-generator system according to an exemplary embodiment.

FIG. 24B is a schematic diagram of an interface of an interface of two heat engines in a heat engine system according to an exemplary embodiment.

FIGS. 25A and 25B are schematic cross-section diagrams of a heat engine according to an exemplary embodiment.

DESCRIPTION

Figure 2:
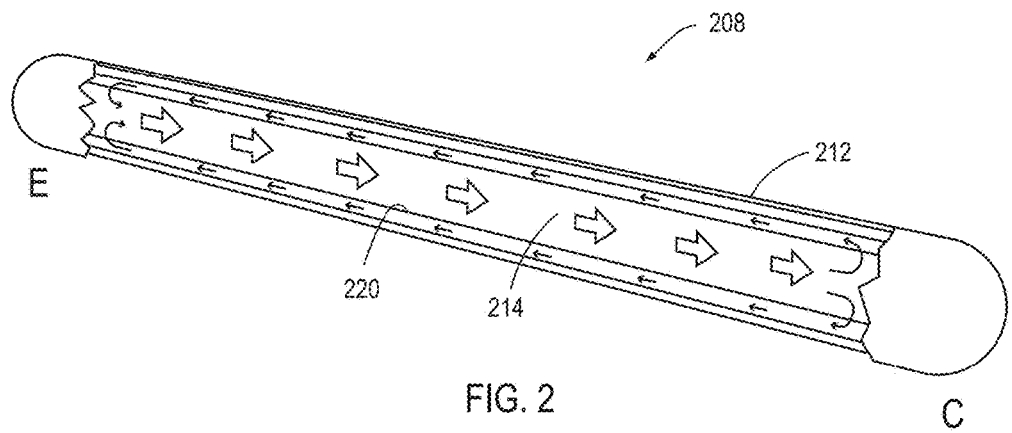
FIG. 2 is a schematic cross-section perspective view of a heat pipe according to an exemplary embodiment.

Referring to FIG. 1A a power generation system 100 is shown schematically. System 100 comprises a heat engine system 200 comprising at least one heat engine, and a generator system 300 employing an expander and generator capable of generating power for delivery to a network or distribution system 400. According to an exemplary embodiment, system 100 is configured to generate power such as electricity for use in a facility, vehicle, etc. System 100 also comprises a control system 110, a heat exchanger 180 providing thermal energy from a heat source to the evaporator end of the heat engine, and a heat exchanger 190 to reject heat at the condenser end of the heat engine. Control system 110 comprises an instrumentation and control system 120 for heat engine system 200 and an instrumentation and control system 130 for generator system 300 (as well as instrumentation and control for other components of system 100). The heat source to provide thermal energy to the heat engine system may be waste heat from a power plant, solar energy, geothermal energy or other available sources of heat, for example, from commercial or industrial processes. According to an exemplary embodiment shown schematically in FIG. 1A, heat engine system 200 comprises an array of heat engines 210. According to other exemplary embodiments, the heat engine system will comprise at least one heat engine. See, e.g., FIG. 25 and FIGS. 30A through 30E.

Referring to FIG. 1B, according to an exemplary embodiment, each heat engine comprises a heat pipe that contains a working fluid that in a two-phase thermal cycle is evaporated into a (high pressure) vapor phase V at an evaporator end E and flows through a passage to a condenser end C where it is condensed to a (low pressure) liquid phase L; the liquid phase working fluid L flows through a flow path shown as a capillary structure (or wick) from the condenser end C to the evaporator end E to continue the cycle. Thermal energy is supplied at the evaporator end E of the heat pipe from heat exchanger 180 (to heat the working fluid to a vapor or gas); a heat exchanger 190 is used to recover heat at the condenser end C of the heat pipe (and to cool the working fluid to a liquid). According to an exemplary embodiment, the heat pipes may be sealed individually and each heat pipe will self-contain suitable supply of working fluid for operation over a useful period of life (e.g. with limited or routine maintenance).

As shown in FIGS. 1A and 1B, heat engine system 200 is coupled to generator system 300. Generator system 300 is shown schematically in FIG. 1D. Generator system 300 comprises an expander 310 (e.g. a turbine system, turbo-machine, screw expander, root expander or gear pump, reciprocating piston expander, etc.) and a generator 360 (i.e. with associated power conditioning/converter electronics). As indicated in FIGS. 1A, 1B and 1C, in operation of the heat engine, useful work can be performed by the working fluid in vapor phase V (i.e. at high differential pressure and temperature) flowing from the evaporator section E of the heat pipe through expander 310 (e.g. a turbo-machine) to the condenser section C of the heat pipe. According to an exemplary embodiment, the expander produces a mechanical output (e.g. a rotating shaft) that serves as the input to an electric generator. Referring to FIG. 1D, generator system 300 comprises an interface 500 between expander 310 and generator 360; interface 500 comprises (among other things) a bearing system 600 and a coupling system 700 to transmit torque/rotational energy.

According to an exemplary embodiment shown in FIG. 1C, the expander will be in the form of a turbine 310*a* configured to perform mechanical work (i.e. driving a rotating shaft) acting through the interface to operate the generator (i.e. an electromagnetic generator). According to an exemplary embodiment, the interface may also comprise seals for any components (e.g. dynamic seals for shaft 305) that extend through the shell of the heat pipe as well as a thermal management system (such as insulation) between the heat pipe and other external components of the heat engine or generator system that are adjacent to the heat pipe.

Definitions

The term "heat engine" generally refers to a device or apparatus that converts heat to useful work. A heat engine comprises a single assembly (i.e. "heat pipe" or "heat tube") that has a hot end (coupled to a heat source) and a cold end (coupled to a heat sink). A heat engine can provide a mechanical output (i.e., a rotating, or possibly oscillating, member that can drive a mechanical load). A heat engine may comprise a heat pipe with an expander (e.g. turbine, turbine stage or turbine stages, turbo-machine, piston, screw expander, gear arrangement, etc.). A heat pipe configuration with an expander that forms a single assembly with a single output would operate as a heat engine (for example, with several wicks and evaporators feeding a single turbine assembly, or two heat pipes connected in series with turbines sharing a common shaft, etc.). Series-connected heat pipes with turbines that are not on a common shaft may be considered as either one heat engine or two heat engines.

"Generator" is a device or apparatus that converts mechanical power to electric power. A generator may include conventional (commutated electro-magnetic) generators, alternators, piezoelectric generators, etc. "Generator assembly" or "generator system" is a generator and any associated apparatus with the generator, such as bearings, thermal management/cooling systems, transformer(s), AC-DC inverter/converter, DC-DC converter, control electronics, couplings, gears/gearing, clutches, transmissions, etc. A "generator subsystem" is a set of generators.

An "integrated" generator is a generator where at least some components of the generator (usually the rotor) are inside a sealed heat pipe (e.g. not readily removable). An "integral" or "internal" generator is physically contained substantially or entirely inside a heat pipe (i.e. within the pressure envelope within the heat pipe), for example, with only electrical connections through the wall or shell of the heat pipe. A generator may be partially integrated if certain of the components are included within the heat pipe and certain of the components are external to the heat pipe, for example, with the rotor and shaft within the heat pipe and magnetic/electromagnetic elements (e.g. stator) and associated wiring/coils external to the heat pipe. A generator may also be partially integrated if it comprises rotating elements that are magnetically coupled to rotating elements of the expander (e.g. turbo-machine, etc.) within a sealed heat pipe (rather than with a dynamic mechanical connection). A "discrete" or "separate" generator would have substantially all components of the generator outside the heat pipe, for example, with a coupling through the shaft of the expander or turbo-machine within the heat pipe of the heat engine (e.g. in concept the discrete generator could be disconnected from the heat engine and attached to some other mechanical driver).

A "heat engine generator" or "heat engine system" refers to a heat engine in combination with the components of the generator (or other apparatus) to convert the mechanical output to electricity (e.g. includes the generator assembly). A "heat engine array" is a set of any number of heat engines installed at one location (e.g. configured to use a common heat source) an "assembly" or "subarray" can be a subset of a heat engine array with heat engines that are mechanically or otherwise connected together. For example, a heat engine array might have any number of heat engines (e.g., two or four or six or ten or sixteen, etc.) arranged in an assembly; a heat engine array may be modular insofar as it allows for selective removal and replacement of one or more heat engines from the array.

"Useful work" includes, for example, mechanical energy or electrical energy.

"Capillary" or "capillary structure" refers to any structure that can be used to transport liquid (such as the flow of working fluid in liquid phase) via capillary forces from a lower-temperature region such as the condenser section or reservoir to a higher temperature region such as the evaporator section. A capillary structure may also be referred to as a "wick" (as the term generally used to refer to a capillary structure fabricated from a woven material). The term "capillary structure" is to be given its broadest meaning to include a structure comprising grooves, screens or meshes, open-celled foams, porous materials such as sintered particles, nanoporous materials such as zeolites, aerogels, etc. and combinations. Capillary structures may be comprised of metal, plastic, glass, ceramics, fabric, or any other suitable material. According to an exemplary embodiment, the capillary structure will comprise a material that is "wetted" by the liquid of interest (i.e. that is at least partially hydrophilic) and which is compatible (i.e. capable of use and operation) within the operating conditions such as the temperature range to which the capillary structure is exposed. The configuration of the capillary structure in combination with the characteristics of the working fluid and operating conditions will typically determine the amount of surface energy/capillary force that is developed within the capillary structure and as a result the pressure differential that exists between the condenser section C and the evaporator section E of the heat pipe.

Capillary structures are characterized by a "feature size" or "pore size" or "channel size" which describes the size and scale over or through/across which capillary forces are exerted. For a given liquid, capillary forces (and therefore maximum pressure differentials) increase with decreasing pore size. Depending on the liquid properties, the flow resistance for a given liquid will generally also increase with decreasing pore size. For many capillary structures such as those made of sintered materials or open cell foams, the actual size of an individual pore or channel may not be uniform if examined at a given cross-section of the capillary structure (i.e. varying with some statistical distribution about a mean size), in which case the characteristic (or effective) pore size will generally be considered either the statistical mean size at the section, or some other function of the statistical distribution which characterizes the capillary properties. "Pore size" describes random or periodic patterns of holes, like grids or open-cell foams; "channel size" is used to describe more-or-less continuous channels, like etched or milled channels or stacks of fibers. "Pores" or "channels" or "features" and "pore size" or "channel size" and "feature size" are intended as general terms to have the broadest meaning.

A "capillary-pumped" heat engine is a heat pipe configured to operate as a heat engine (i.e. to perform useful work) and that comprises a capillary structure for flow of the working fluid from the condenser section to the evaporator section. The term "capillary-pumped heat engine system" refers to a heat engine system with at least one capillary-pumped heat engine (i.e. one or multiple heat engines) that within the heat pipe that comprises a capillary structure of some kind for flow of the liquid phase working fluid and also an expander such as a turbo-machine that can be used to perform useful work in an application.

The general terms are "microfabrication" for structures down to 1 μm, and "nanofabrication" for smaller structures. Microfabrication and nanofabrication techniques could be used to fabricate the capillary structure of a heat pipe according to exemplary and alternative embodiments.

"Lithography" is intended as a catch-all term for (e.g. by micro- or nano-fabrication) "writing" a pattern or shape on a surface or object and then by some further process fabricating a permanent structure. Lithographic techniques could be used to fabricate the capillary structure of a heat pipe.

"Photolithography" (and more generally "photoetching") uses an optical process to expose a photosensitive resist applied to the surface (or object). In fabrication, either the exposed or unexposed resist is washed away (depending on the type of resist) and the underlying surface material is then removed (i.e. exposed material not protected by the resist). The material can be removed by chemical (i.e. wet) etching, plasma or reactive ion etching, ion milling, etc. There are variations such as e-beam lithography that can form structures as small as a few nanometers in size (e.g. for channels or holes, including "deep" holes (up to 100:1 aspect ratio)). Photolithography is an example of a lithographic technique that could be used to fabricate the capillary structure of a heat pipe.

As another example, "nanoimprint" lithography can be used to "print" a pattern of material on the surface using essentially a "stamping" process. Nanoimprint lithography is less expensive potentially than photolithography and can make features down to a few nanometers in size, but with less alignment precision than photolithography. Nanoimprint fabrication is capable of making submicron capillary structures. Nanoimprint fabrication techniques could be used to fabricate the capillary structure of a heat pipe.

"3-D printing" and specifically "3-D nanofabrication" comprises techniques for three-dimensional (3-D) structures (as opposed to features formed on a basically two-dimensional (2-D) surface). The 3-D fabrication techniques at present can make arbitrary shapes such as stacks of cylinders down to submicron scales (though currently at relatively high cost). Such 3-D fabrication techniques could be used to fabricate the capillary structure of a heat pipe.

"MEMS" (microelectromechanical systems) comprises a set of (mostly lithographic) techniques for making complex structures on micron scales, including gears, turbines, bearings, etc. (potentially at a relatively less expense than by other fabrication techniques). MEMS can be used to form both capillary structures and for small turbine parts, bearings, etc. "NEMS" (nanoelectromechanical systems) comprises the same techniques as MEMS but operates at smaller scale. MEMS and NEMS techniques could be used to fabricate the capillary structure of a heat pipe.

"Photonic crystal fibers" are glass-fiber structures with precise patterns of micron-to-submicron holes; as an example fabrication of precision capillary-type structures on industrial scale. Photonic crystal fiber fabrication techniques are precise (and typically more expensive). Such fabrication techniques could be used to fabricate the capillary structure of a heat pipe.

Exemplary Embodiments

As shown in FIGS. 1A through 1C, the heat engine system comprises a heat engine 210 comprising at least one heat pipe.

Figure 3A:
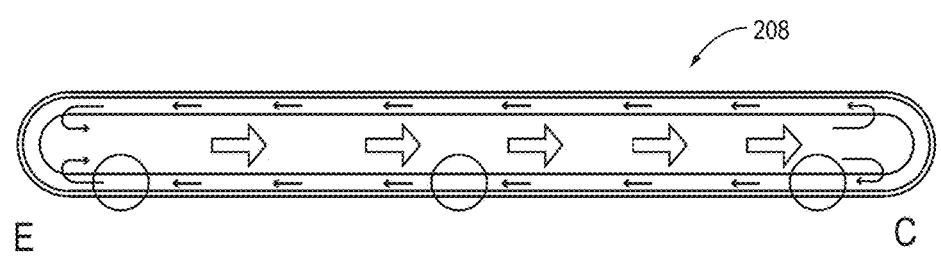
FIG. 3A is a schematic cross-section side view of a heat pipe according to an exemplary embodiment.
Figure 4:
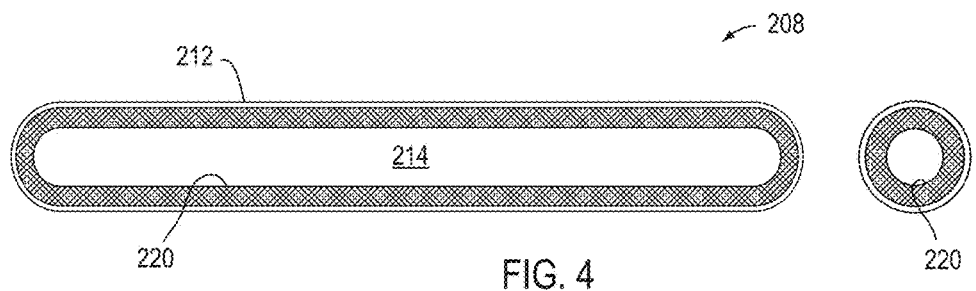
FIG. 4 is a schematic cross-section view of a heat pipe according to an exemplary embodiment.

Referring to FIGS. 2, 3A and 4, a heat pipe 208 is shown schematically according to an exemplary embodiment. Heat pipe 208 comprises an outer casing or wall shown as shell 212. Heat pipe 208 comprises an evaporator section E and a condenser section C. In evaporator section E, the working fluid is heated and evaporated into a vapor phase; the vapor has a generally central flow path shown as passage 214 from evaporator section E to condenser section C. In condenser section C, the working fluid is cooled and condensed into a liquid phase; the liquid flow has a flow path inside of the wall shown as a capillary structure 220 from condenser section C to evaporator section E.

Figure 3B:
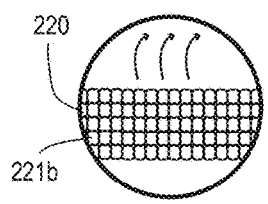
FIGS. 3B through 3J are schematic cross-section end views of the heat pipe shown in FIG. 3A according to an exemplary embodiment.
Figure 3C:
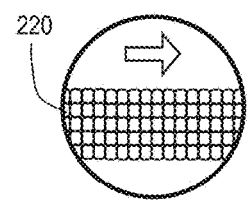
Figure 3D:
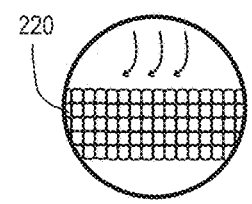
Figure 3E:
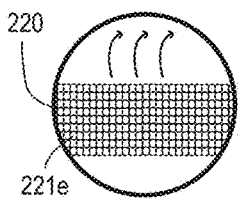
Figure 3F:
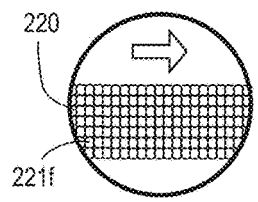
Figure 3G:
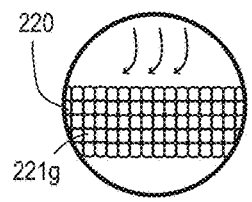
Figure 3H:
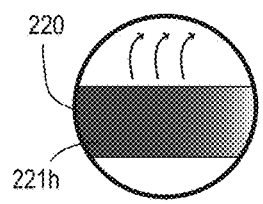
Figure 3I:
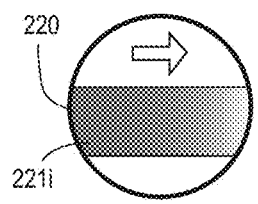
Figure 3J:
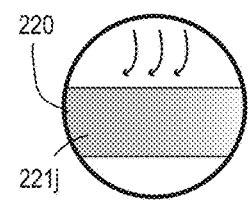

As shown schematically in FIG. 3A with FIGS. 3B through 3J, flow path 220 for the working fluid in the liquid phase within comprises features or pores 221 through the capillary structure in the wall of heat pipe 208. Flow of the liquid phase working fluid is induced by a pumping action produced by the capillary forces that draw the liquid phase working fluid into the capillary structure at the condenser section C and through the capillary structure into the evaporator section E to be heated into vapor phase working fluid. As indicated in FIGS. 3B through 3D, according to an exemplary embodiment, the features or pores of the capillary structure may be generally consistent in size/form along the length of the heat pipe; as shown schematically in FIG. 3B, the heat pipe may have a flow path 220 with a generally uniform pore size 221b at condenser section C and at the evaporator section E. As indicated schematically in FIGS. 3E through 3G, the features or pores of the capillary structure may be provided (e.g. in a mesh/fiber or grid structure) to vary in size/form along the length of the heat pipe; according to an exemplary embodiment shown in FIG. 3G, at condenser section C the heat pipe has a capillary structure with pore size 221g; as shown in FIG. 3F, at an intermediate section between condenser section C and evaporator section E the heat pipe has a capillary structure with reduced pore size 221f; as shown in FIG. 3E, at evaporator section E the heat pipe has a capillary structure with a further reduced pore size 221e. As indicated schematically in FIGS. 3H through 3J, the features or pores of the capillary structure may be provided (e.g. in a material or structure) to vary in size/form along the length of the heat pipe; according to an exemplary embodiment shown in FIG. 3J, at condenser section C the heat pipe has a capillary structure with pore size 221j; as shown in FIG. 3I, at an intermediate section between condenser section C and evaporator section H the heat pipe has a capillary structure with reduced pore size 221i; as shown in FIG. 3H, at evaporator section E the heat pipe has a capillary structure with a further reduced pore size 221h. According to a preferred embodiment indicated schematically in FIGS. 3E and 3H, the heat pipe with a flow path 220 with a reduced pore size 221e and 221h (e.g. approximately 10 nanometers) at the evaporator section will elevate the differential pressure of the working fluid (e.g. to a pressure as high as 100 bar).

According to any exemplary embodiment, the heat pipe and capillary structure may be constructed in a wide variety of forms and of a wide variety of materials, depending upon the application and operating conditions, the working fluid, desired pore/feature size, etc. The capillary structure may comprise powdered metal, sintered metal, metal foam, metal fiber or particles, fiberglass, grooves/slots, a screen or mesh, a nano-structure, a grain structure, zeolites (or other compound or molecular form providing a small-scale porous structure), etc. According to an alternative embodiment, the capillary structure may be provided with a coating or chemical treatment to enhance the hydrophilic properties (e.g. increasing the surface tension or surface energy that can be developed within the capillary structure per unit of area). According to other exemplary embodiments, the capillary structure may be fabricated using lithographic, nano-imprint/printing, 3-D printing, MEMS, NEMS, micro-crystal formation, or other micro- or nano-fabrication techniques that allow for the creation of submicron- and nano-sized pores or features for a capillary structure that is capable of developing a higher surface tension/capillary forces and of withstanding a higher pressure differential.

According to preferred embodiments, the capillary structure will be configured to operate over wide range of operating pressures and to support a relatively high pressure differential (e.g. ranging from at or below 0.1 bar to 100 bar or above) between the evaporator section and condenser section of the heat tube without high flow resistance for the liquid phase working fluid. The selection of the capillary structure will according to any preferred embodiment be made according to design objectives for the heat pipe. According to an exemplary embodiment, the working fluid may be any fluid suitable for use in a heat pipe under the operating conditions (e.g. temperature and pressure), for example, water or methanol (for applications at relatively lower temperature), mercury or lithium or inorganic salts (for applications at higher temperature), etc.

Figures 5A, 5B, 5C:
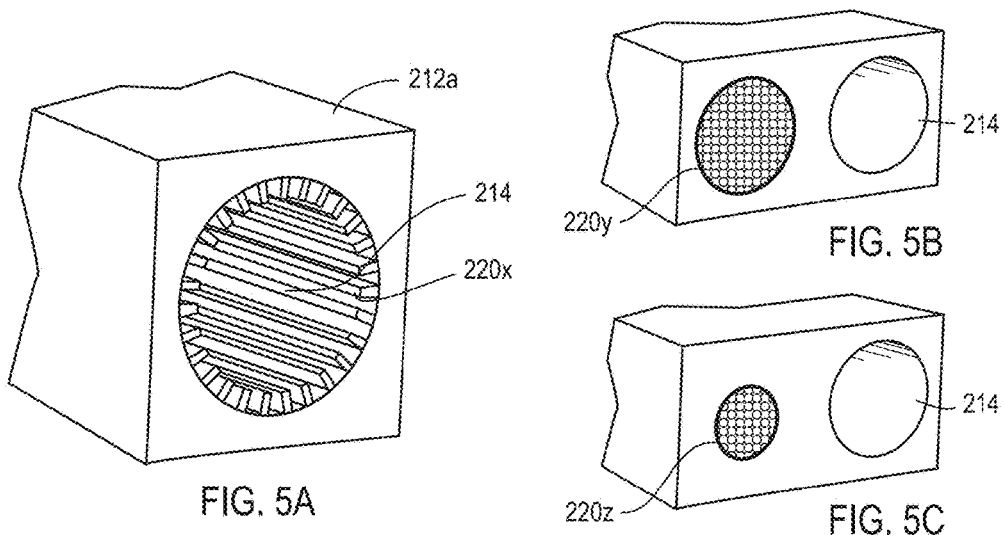
FIGS. 5A through 5C are schematic cross-section perspective views of a heat pipe according to an exemplary embodiment.

According to an exemplary embodiment shown schematically in FIG. 5A through 5C, the heat pipe may provide a housing or shell 212a that is orthogonal in form (in the exterior). As shown in FIG. 5A, the heat pipe may provide a central passage 214 for the vapor and an integrated annular flow path for the liquid comprising grooves 220x. As shown in FIGS. 5B and 5C, the heat pipe may comprise a passage 214 for the vapor that is separate and in parallel with the flow path 220 for the liquid (with the passage and flow path connected at the condenser end and evaporator end of the heat pipe, see FIG. 1B). As shown in FIGS. 5B and 5C, the cross-section area of the flow path may vary according to design and performance criteria; as shown in FIG. 5B, the flow path 220y is larger than as shown in FIG. 5C the flow path 220z. According to an exemplary embodiment, the flow path for the liquid may comprise a capillary structure that is fabricated as an insert (e.g. having one section or multiple sections) sized and shaped to be fitted and installed securely within the shell or housing of the heat pipe.

Figures 6A, 6B, 6C, 6D, 6E:
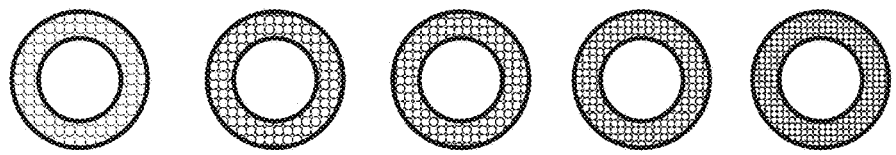
FIGS. 6A through 6N are schematic cross-section end views of a heat pipe according to an exemplary embodiment.
Figures 6F, 6G, 6H, 6I, 6J:
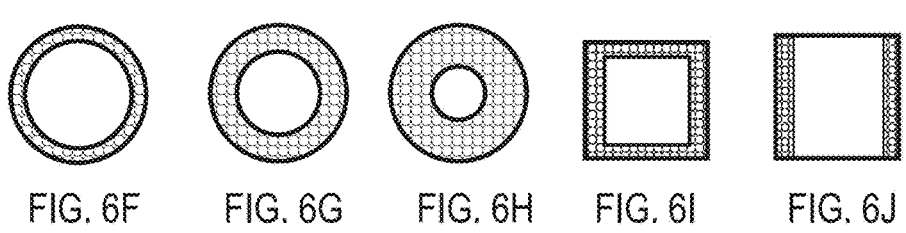
Figures 6K, 6L, 6M, 6N:
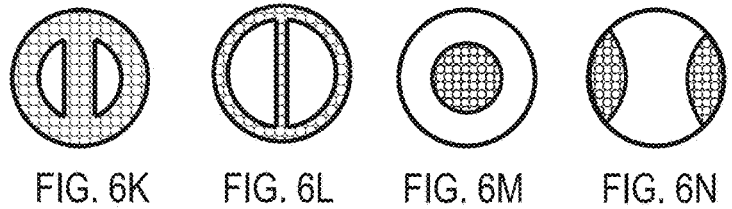

Referring to FIGS. 6A through 6N and 7A through 7G, according to other exemplary embodiments (shown schematically), the heat pipe may have any of a wide variety of forms, sizes, shapes and configurations that would allow or result in a corresponding variety of forms, sizes, shapes and configurations of the flow paths for the vapor flow and for the liquid flow within the heat pipe (e.g. as provided by the capillary structure). As shown in FIGS. 6A through 6E, the pore size of the flow path for the liquid may vary from relatively large (see FIG. 6A) or relatively small (see FIG. 6E) while the annular cross-sectional area of the flow path remains generally consistent. As shown in FIGS. 6F through 6H, the dimensions of the annular flow path may vary in size from smaller (FIG. 6F) to larger (FIG. 6H). As shown in FIGS. 6K through 6M, the cross-section of the heat pipe may comprise a central flow path for the working fluid in liquid phase along with an annular flow path (as shown in FIGS. 6K and 6L) or without any other flow path (as shown in FIG. 6M). As shown in FIGS. 6I and 6J, the heat pipe may have a rectangular cross-section or other non-circular cross-section. As shown in FIGS. 6F through 6K, the size of the central flow path for the working fluid in vapor phase may be reduced or enlarged. As shown in FIGS. 6J and 6N, the flow path for the working fluid in liquid phase may be at opposed internal walls within the heat pipe. Other variations of the heat pipe configuration according to other exemplary embodiments are shown in FIGS. 7A through 7G (including an asymmetrical flow path configuration as in the heat pipe 208g).

Figure 8:
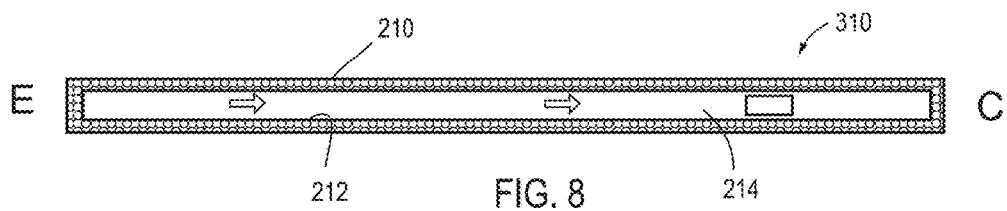
FIGS. 8 through 10 are schematic cross-section side views of a heat engine with expander-generator system according to an exemplary embodiment.
Figure 9:
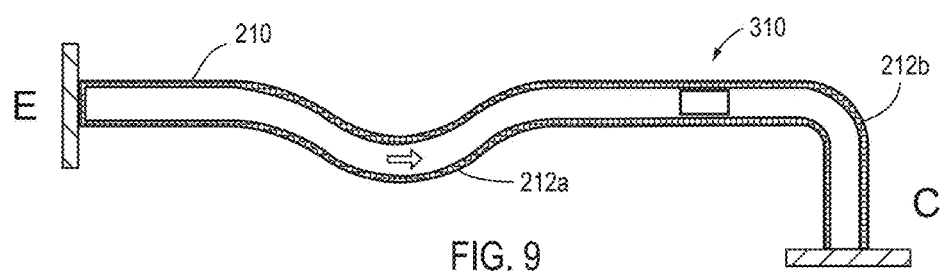
Figure 10:
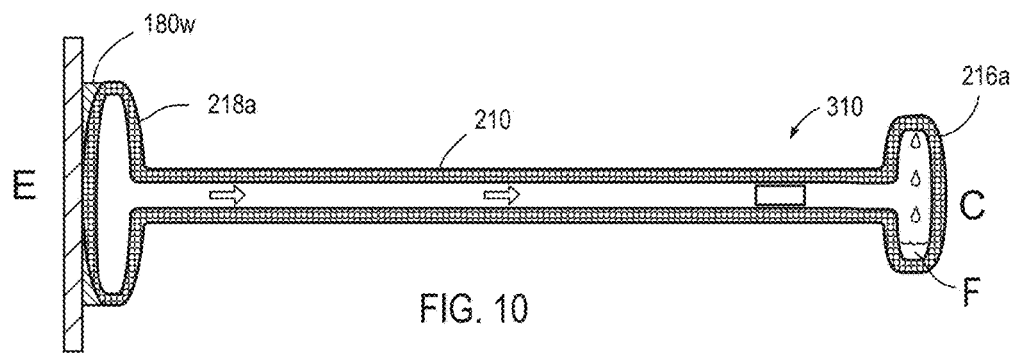
Figure 11:
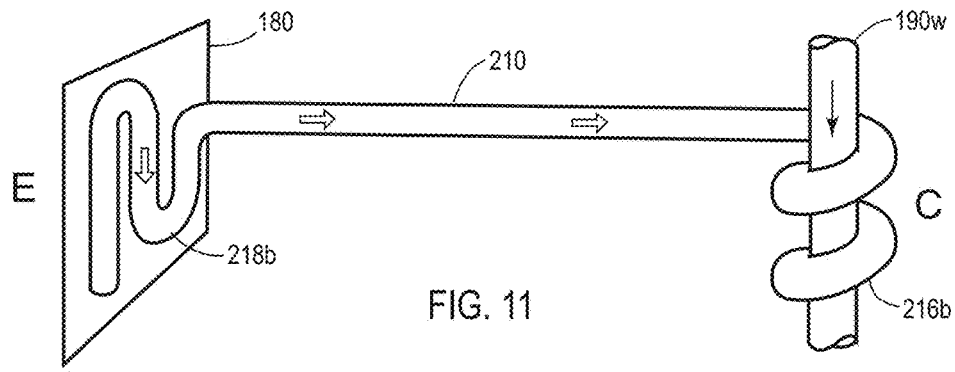
FIG. 11 is a schematic perspective view of a heat engine according to an exemplary embodiment.

Referring to FIGS. 8 through 11 and 12A through 12H, a heat engine 210 comprising a heat pipe with an expander 310 (such as a turbo-machine) for a generator system is shown according to exemplary embodiments. As shown in FIGS. 1A through 1C and 12A, in operation of heat engine 210 the vapor phase working fluid that is heated at the evaporator section E of the heat pipe (at higher pressure) is capable of performing useful work if directed to flow through an expander 310 (e.g. for a turbo-machine with rotating turbine blades as shown in FIG. 1C in the form of a mechanical output on a rotating shaft); the working fluid is then condensed to liquid phase at the condenser section C and will return (e.g. through the capillary structure) to the evaporator section E in a continuous cycle. As shown in FIG. 8, the heat engine may comprise a heat pipe 208 with an external shell 212 providing a generally linear form; as shown in FIG. 9, the heat engine may comprise a heat pipe 208 with an external shell having curved (or bent) sections 212a and 212b so that the heat pipe may be sized and configured to be installed in or to fit around physical obstacles. As shown in FIG. 10, the heat engine may comprise a heat pipe with an elongated chamber 218a at the evaporator section E sized and configured to improve heat transfer in contact with a heat source 180w; the heat pipe may also have and an elongated chamber 216a at the condenser section C configured to collect liquid working fluid F. As shown in FIG. 11, the heat engine may comprise a heat pipe 208 with a coil section 218b intended to enhance heat transfer at the evaporator section E with heat source 180 and a coil section 216b intended to enhance heat transfer (e.g. with a coolant or fluid to be heated) at the condenser section C with a heat exchanger element as shown in table 190w.

Figure 12A:
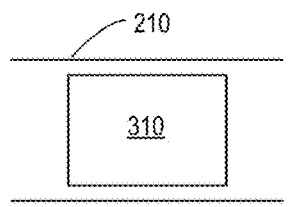
FIGS. 12A through 12H are schematic cross-section views of an expander-generator for a heat engine according to an exemplary embodiment.
Figure 12B:
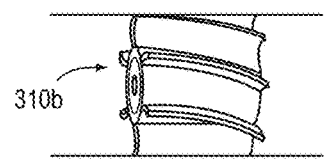
Figure 12C:
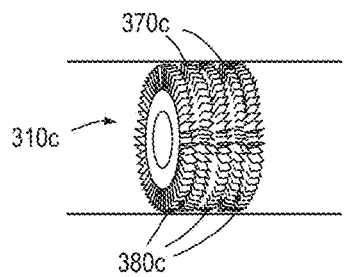
Figure 12D:
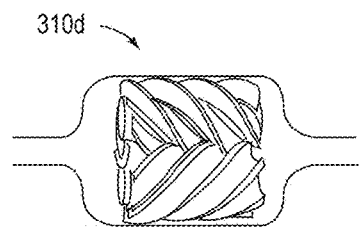
Figure 12E:
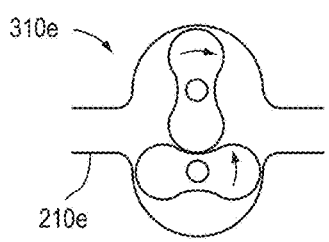
Figure 12F:
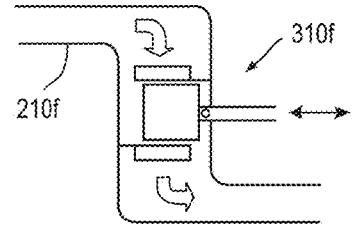
Figure 12G:
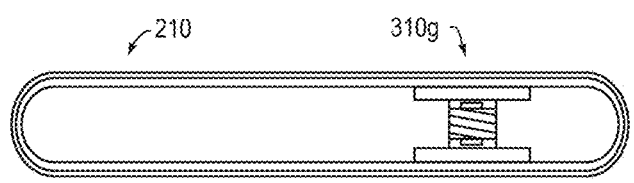
Figure 12H:
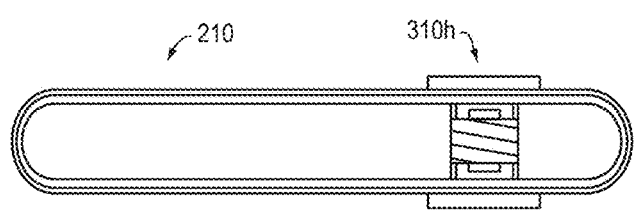
Figure 12I:
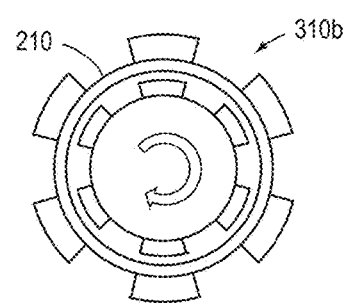
FIG. 12I is a schematic cross-section end view of the expander-generator for a heat engine shown in FIG. 12H according to an exemplary embodiment.
Figure 13D:
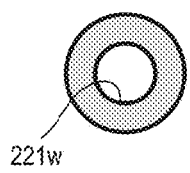
FIGS. 13A through 13D are schematic cross-section end views of a heat pipe according to an exemplary embodiment.
Figure 13C:
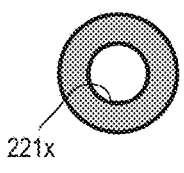
Figure 13B:
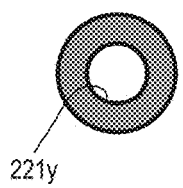
Figure 13A:
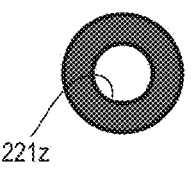
Figure 13E:
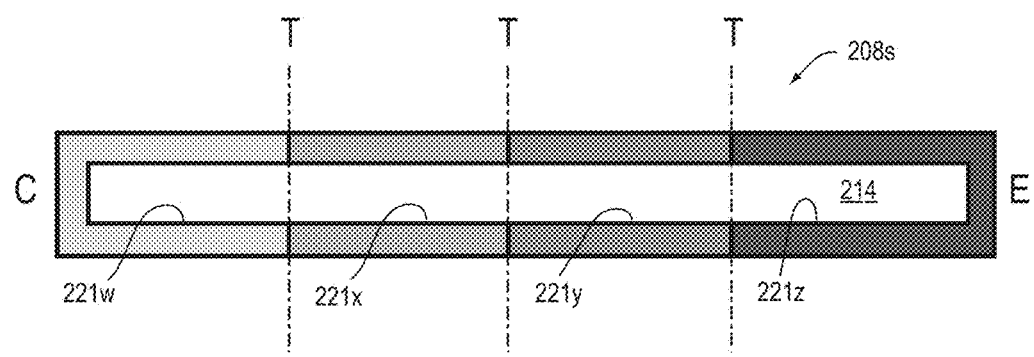
FIGS. 13E and 13F are schematic cross-section views of a heat pipe according to an exemplary embodiment.
Figure 13F:
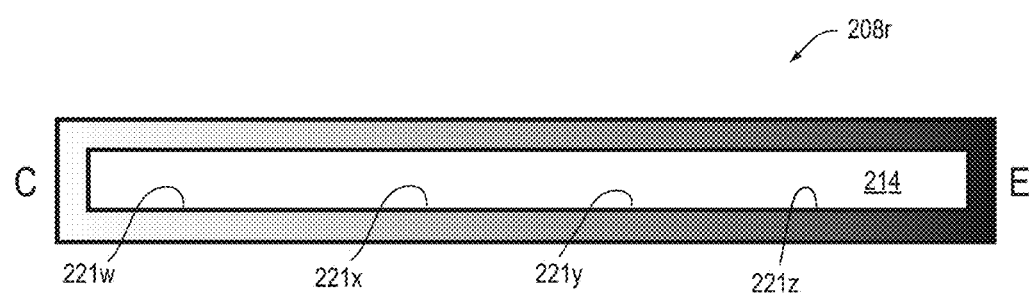

As shown in FIGS. 1C, 12G through 12I and 16A through 16C, it is generally known to install a turbo-machine in a heat pipe to configure a heat engine capable of performing useful (mechanical) work. For example, as shown representationally in FIGS. 1C and 12G through 12I, U.S. Patent Application Publication No. 2007/0151969 has disclosed configurations of a heat pipe having a turbo-machine 310 (installed within the heat pipe). As shown schematically and representationally in FIGS. 12A through 12F, according to exemplary embodiments, any of a wide variety of types of expanders (shown generally in FIG. 12A) can be installed in a heat pipe to configure a heat engine: a single-stage turbine 310b (FIG. 12B), a multi-stage turbine 310c with rotating segments shown as rotors 380c and fixed or stationary segments shown as stators 370c (FIG. 12C), a screw expander 310d (FIG. 12D), a root expander or gear pump 310e (FIG. 12E), a reciprocating piston system 310f (FIG. 12F). As indicated, according to other embodiments, any of a wide variety of expander devices or other turbo-machines may be used in the heat engine; any and all suitable expanders or other turbo-machines (of any kind, present and future) suitable for use in a heat pipe to configure a heat engine are intended to be within the scope of the present application.

Referring to FIGS. 13A through 13F, a heat pipe having a capillary structure for the flow path for the liquid phase of the working fluid with a varying feature/pore size along the length of the heat pipe is shown schematically according to an exemplary embodiment. Heat pipes 208g and 208h are each shown schematically to have a capillary structure configuration where the feature/pore size 221w at the condenser section C is larger than the feature/pore size 221z at the evaporator section E. As shown schematically in FIG. 13E, heat pipe 208g has a configuration with discrete stepped or staged transitions T in feature/pore size between condenser section C and evaporator section E. As shown schematically in FIG. 13F, heat pipe 208h has a configuration with a continuously varying feature/pore size between condenser section C and evaporator section E.

Figure 14A:
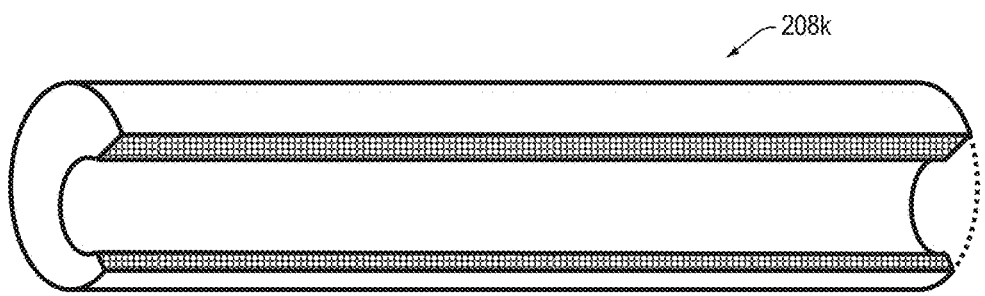
FIG. 14A is a schematic cross-section perspective view of a heat pipe according to an exemplary embodiment.
Figure 14B:
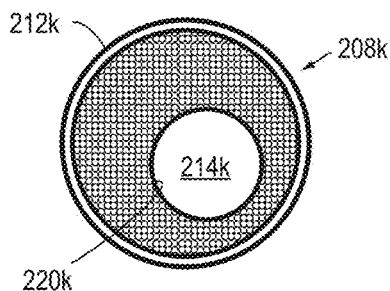
FIG. 14B is a schematic cross-section end view of the heat pipe shown in FIG. 14A according to an exemplary embodiment.
Figure 14C:
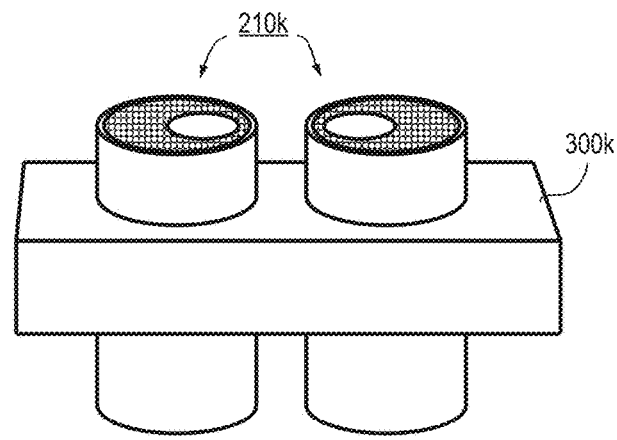
FIG. 14C is a schematic cross-section perspective view of a heat engine system according to an exemplary embodiment.

Referring to FIGS. 14A through 14C, a heat pipe 208k is shown having a cylindrical form with an asymmetrical interior configuration. Heat pipe 208k has a passage 214k providing a path for the vapor phase of the working fluid and a capillary structure configuration 220k providing a flow path for liquid phase of the working fluid on the inside of shell 212k. As shown, a path 220k for the liquid phase of the working fluid is wider on one side of a passage 214k for the vapor phase of the working fluid; passage 214k is off-center within the interior of heat pipe 208k. As shown in FIG. 14C, the heat engine system can be configured with an array of heat engines oriented so that the asymmetrical interior configuration brings passages 214k of heat pipes 210k into closer proximity when installed in a generator system 300k (e.g. so that associated systems of the generator system are in closer proximity) to allow a more compact size for the heat engine.

Figure 15A:
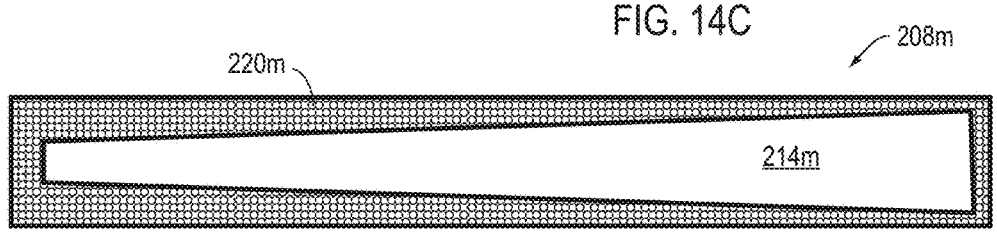
FIGS. 15A and 15B are schematic cross-section side views of a heat pipe according to an exemplary embodiment.
Figure 15B:
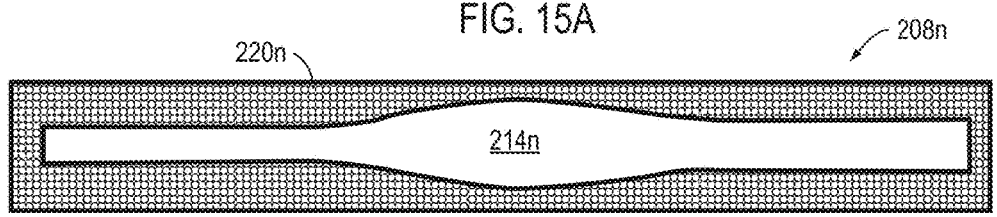
Figure 15C:
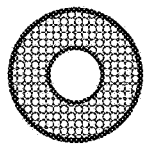
FIGS. 15C through 15E are schematic cross-section end views of a heat pipe according to an exemplary embodiment.
Figure 15D:
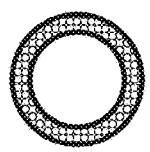
Figure 15E:
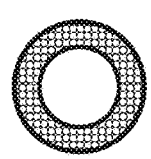

As shown schematically in FIGS. 15A and 15B, according to alternative embodiments, the heat pipe may be configured so the passage for the vapor phase of the working fluid and the flow path for the liquid phase of the working fluid may vary in size/dimension (e.g. cross-sectional area for flow) along the length of the heat pipe. As shown in FIG. 15A, a heat pipe 208m has a passage 214m that is progressively reduced in size and a capillary structure configuration 220m that is progressively expanded in size along the length of the heat pipe from evaporator section/end E to condenser section/end C. As shown in FIG. 15B, a heat pipe 208n has a passage 214n that is enlarged in an intermediate section (e.g. to provide a space for installation of an expander, for example as shown in FIGS. 12D and 12E). The heat pipe will have a corresponding cross-section along its length as shown in FIGS. 15C through 15E. According to other exemplary and alternative embodiments, the heat pipe may have any of a wide variety of other configurations, including with variations in the external dimensions to accompany variations in the internal dimensions (e.g. enlargement of the width of the heat pipe accompanying enlargement of the vapor passage within the heat pipe so that the liquid flow path remains generally the same size).

As shown in FIGS. 12 through 12D and 16A through 16C, it is generally known to combine a turbo-generator with a heat pipe to configure a heat engine. For example, as shown representationally in FIGS. 1C and 12G through 12I, U.S. Patent Application Publication No. 2007/0151969 has disclosed configurations of a heat pipe having a turbine 310.

Figure 16A:
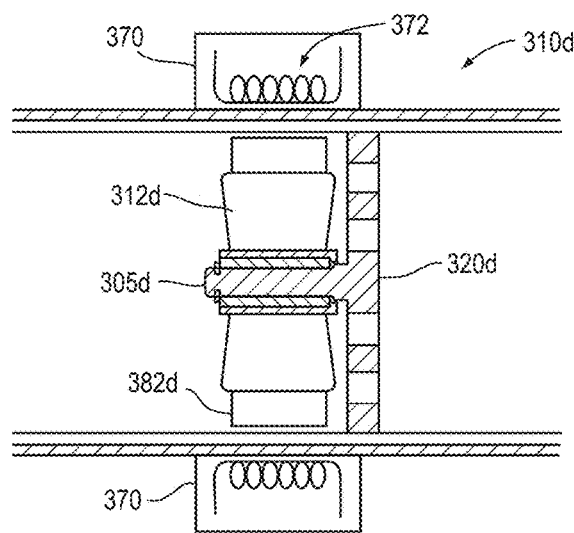
FIGS. 16A through 16C are schematic cross-section views of an expander-generator system for a heat engine according to an exemplary embodiment.
Figure 16B:
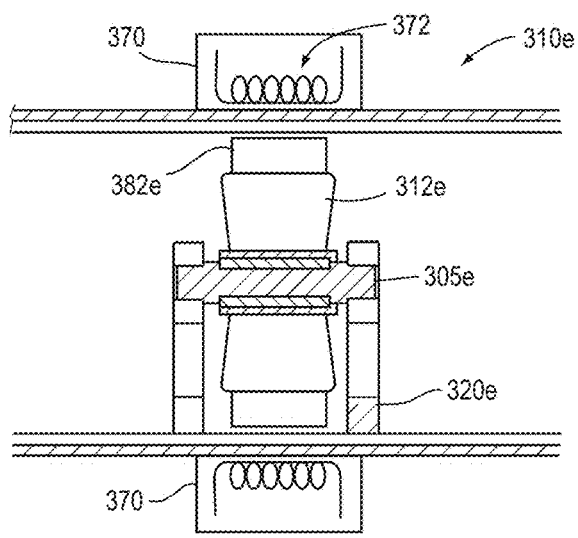
Figure 16C:
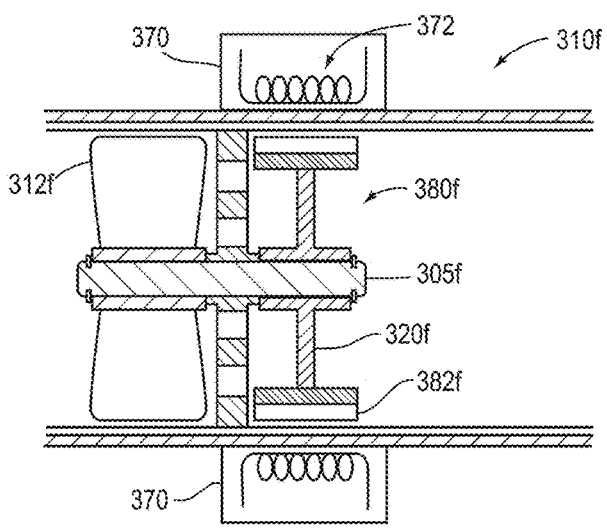

As shown representationally in FIGS. 16A through 16C, U.S. Patent Application Publication No. 2008/0178589 has disclosed configurations of a turbine system associated with a generator system having an stator 370 with a coil 372 external to the heat pipe: (a) a heat pipe 310d having a turbine 310d with rotating blades 312d and associated magnetic elements 382d installed on a shaft 305d with an internal mounting plate 320d; (b) a turbine 310e with rotating blades 312e and associated magnetic elements 382e installed on a shaft with an internal mounting fixture 320e; and (c) a turbine 310f with rotating turbine blades 312f and a separate rotating element 380f installed on a shaft 305f on opposite sides of an internal mounting plate 320f. As indicated, such heat pipe configurations and turbine system configurations can be adapted/modified and integrated within a heat engine/power generation system according to exemplary embodiments of the heat engine.

Adaptations and modifications of a generator system integrated within a heat pipe for a heat engine are shown schematically according to exemplary embodiments in FIG. 17A through 17H. According to an exemplary embodiment, the expander of the generator system comprises a turbine system with a turbine/fan with blades/vanes installed between the evaporator section and the condenser section of the heat pipe in the passage for vapor phase working fluid. The expander (e.g. turbine, fan, screw, gear, piston, etc.) installed in the heat pipe is configured to rotate (or translate) continuously as driven by a generally continuous flow of vapor phase working fluid from the evaporator section to the condenser section in the thermal/energy cycle of the heat pipe; liquid phase working fluid is returned from the condenser section to the evaporator section by flow path 220 of the heat pipe. According to any exemplary embodiment, the expander configuration can be of any suitable known configuration for the operating conditions (e.g. suitable for installation and reliably use within the heat pipe and exposure to the vapor phase working fluid and associated temperature ranges, pressure ranges, flow rates, etc.). According to a particularly preferred embodiment of a heat engine, a micro-turbine system may be installed in the heat pipe.

As shown schematically in FIGS. 17A through 17C, a expander 310 may comprise a one-stage system with single stage 320a, a two-stage system with first stage 320a and second stage 320b, and a three-stage system with first stage 320a and second stage 320b and third stage 320c. (In each system each stage of the turbo-machine may be installed on a common shaft; according to an alternative embodiment, each stage may be installed on a separate shaft.) According to other exemplary embodiments, the number of turbine stages may be expanded if suitable within a particular application (i.e. based on operating conditions such as pressure and temperature, etc.).

As shown schematically in FIG. 17D, the generator system can be configured to have an internal rotating element 380 (e.g. representative of rotor of a generator associated with a rotating turbine element) and an internal stationary element 370 (e.g. representative of the stator of a generator) within the heat pipe of the heat engine.

As shown schematically in FIG. 17E, the generator system can be configured to have an internal rotating element 380 (e.g. representative of the rotor of a generator associated with a rotating turbine element) and an external stationary element shown as armature 370 (e.g. representative of the stator of a generator) relative to the heat pipe of the heat engine.

As shown schematically in FIG. 17F, the generator system can be configured to have an internal rotating element 380 (e.g. representative of the rotor of a generator associated with a rotating turbine element) with magnetic elements 382 (e.g. magnets installed at the tips of the blades of the turbine) within the heat pipe and an external stationary element (e.g. representative of the stator of a generator).

As shown schematically in FIG. 17G, a turbine system may be installed within a heat pipe having an asymmetrical configuration in which the passage for vapor phase working fluid is offset within the heat pipe and the capillary structure configuration providing the flow path for liquid phase working fluid is wider on one side of the passage than on the other. See also FIGS. 14A through 14F.

As shown schematically in FIG. 17H, the generator system can be configured to have an internal rotating element 380z (e.g. representative of the rotor of a generator associated with a rotating expander element) that is constrained within a set of guides or ring bearing system 340z (i.e. a shaftless rotor); the heat pipe is configured to provide a capillary structure with a central flow path 220z for the return of liquid phase working fluid from the condenser section to the evaporator section. As shown, the flow path for the liquid phase working fluid does not include any annular flow path in or adjacent to the shell of the heat pipe; the heat pipe can be configured more readily to allow the passage of the magnetic field from within the heat pipe (e.g. to the coil of an external generator) without absorption or attenuation.

As indicated in FIGS. 17A through 17H, the components/elements of the generator system within the heat pipe are subjected to the environment and operating conditions of heat and pressure within the heat pipe and according to any preferred embodiment are designed to operate suitably under the operating conditions; components/elements of the generator system within the heat pipe are also generally inaccessible for purposes of monitoring/inspection and service/maintenance and more difficult to connect to an instrumentation and control system. According to other exemplary alternative embodiments, the generator system may be configured so that certain components/elements are installed outside of the heat pipe rather than within the heat pipe.

Figure 18A:
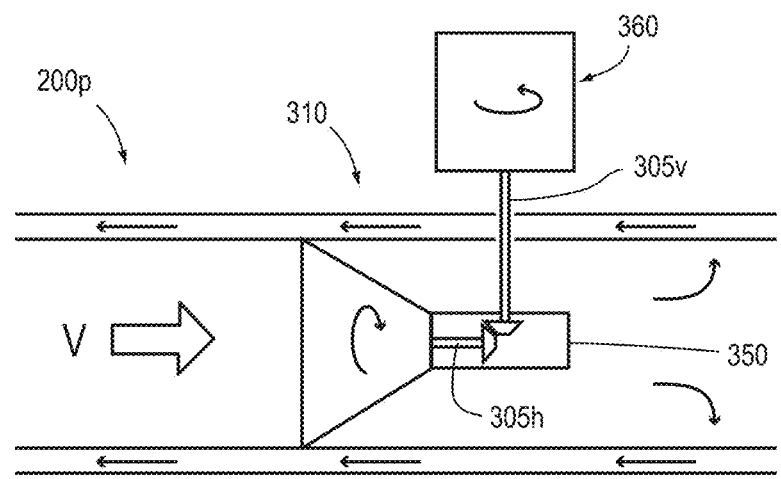
FIGS. 18A and 18B are schematic diagrams of an expander-generator system for a heat engine according to an exemplary embodiment.
Figure 18B:
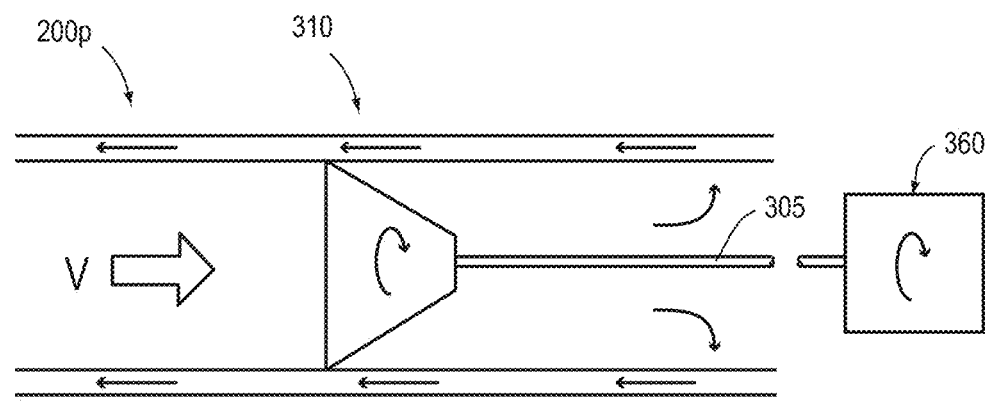

As shown in FIGS. 18A and 18B, a heat pipe engine can be provided with a generator system having an interior expander 310 (e.g. turbo-machine powered by vapor phase working fluid) connected to an exterior generator 360 by a coupling system 350. For example, as shown representationally in FIG. 18A, U.S. Pat. No. 4,186,559 has disclosed a system in which the turbine is separate from the generator (e.g. coupled by a gear system comprising a pair of bevel gears); as shown, the generator is out of the gas/vapor flow path and not subjected to the same environment and operating conditions as the turbine. Return flow of liquid (in an annular flow path) bypasses the turbine.

Figure 19:
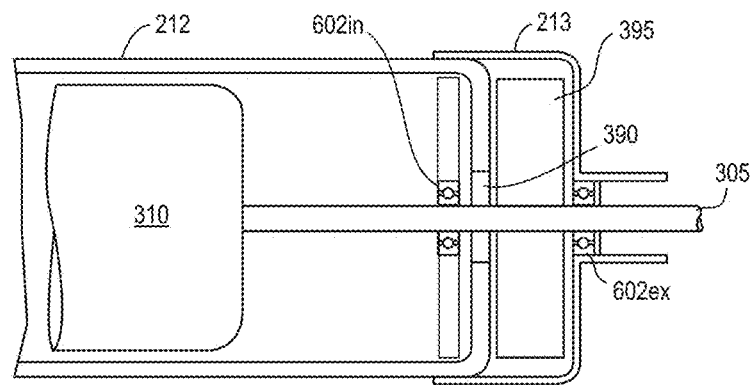
FIG. 19 is a schematic cross-section view of a heat engine according to an exemplary embodiment.

As shown in FIG. 19, it is known that rotating machinery such as generator system will typically require a bearing system. For example, as shown representationally in FIG. 19, U.S. Pat. No. 2,707,863 has disclosed a bearing system for a rotating expander 310 within an enclosure to equipment (not shown) in the exterior of the enclosure. A mechanical bearing system 602 for shaft 305 (shown representationally) is exterior to the enclosure. (Shaft 305 extends through a seal 390 of the enclosure.) According to an exemplary embodiment, as shown in FIG. 19, the system may be adapted to provide a thermal barrier 213 comprising insulating material 213*i* between the enclosure (which typically will contain gas/vapor at elevated temperature and pressure) and the equipment connected to the expander 310 within the enclosure. As indicated in FIG. 19, heat may be transmitted from the expander to the equipment by conduction through the shaft; exposure to elevated temperatures may be detrimental to component/elements of the system, including the mechanical bearings.

Figure 20A:
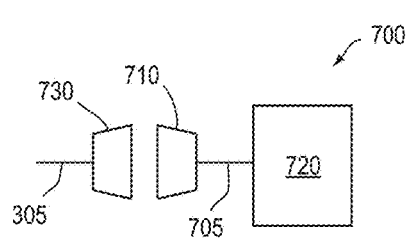
FIG. 20A is a schematic block diagram of a magnetic coupling system for an expander-generator system of a heat engine according to an exemplary embodiment.
Figure 20B:
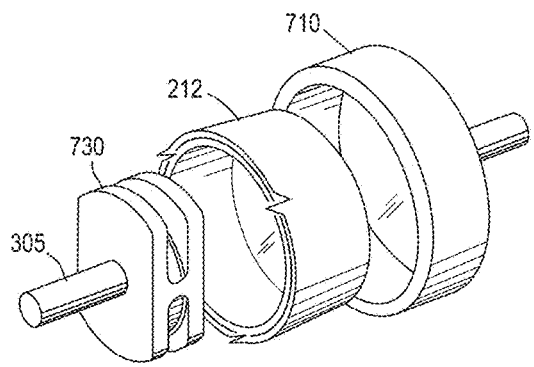
FIG. 20B is a schematic perspective view of a magnetic coupling system for an expander-generator system of a heat engine according to an exemplary embodiment.
Figure 20C:
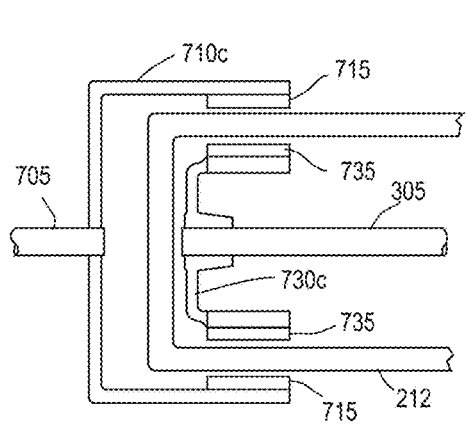
FIGS. 20C and 20D are schematic cross-section views of a magnetic coupling system for an expander-generator system of a heat engine according to an exemplary embodiment.

According to other exemplary embodiments, the expander may be connected to the generator (or other equipment) by a coupling system comprising a magnetic coupling system 700 of a type shown FIGS. 20A and 20B. A shown schematically in FIG. 20A, a magnetic coupling system 700 comprises an interface or coupler 710 with a shaft 705 connected to a magnetic gear system 720. As shown representationally in FIGS. 20B through 20D, and as indicated in U.S. Pat. No. 3,301,091 (see FIG. 1), U.S. Pat. No. 4,146,805 (see FIG. 1), and U.S. Pat. No. 3,683,249 (see FIG. 8), configurations for magnetic coupling systems that can be used to transmit torque and rotation from a shaft of a rotating machine in a sealed chamber to a shaft external to the chamber without direct or intermediate physical contact between the shafts are known generally.

Figure 20D:
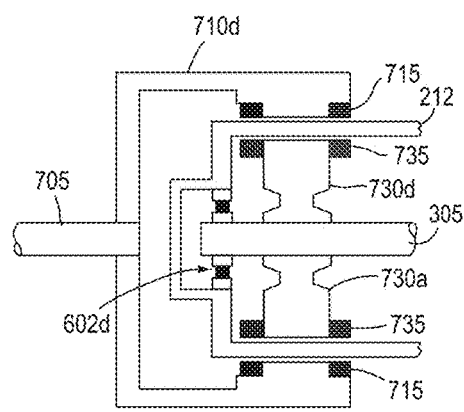

As indicated schematically and representationally in FIGS. 20A through 20D, according to an exemplary embodiment, the heat engine can be provided with a magnetic coupling system 700 through which rotating shaft 305 of the expander within the heat pipe of the heat engine by interface or coupling 730 can be coupled to a shaft 704 for the generator through interface or coupling 710 (without any direct or indirect physical contact of the shafts). Rotation/torque of the output shaft of the turbine system installed within the heat pipe is transmitted through the (non-conducting) exterior wall of the heat pipe by the magnetic coupling system to produce a rotation of the input shaft for the magnetic coupling system that can be connected to the generator of the heat engine. As shown schematically and representationally in FIGS. 20B through 20D, torque/rotation of an internal shaft 305 (input) is transmitted through magnetic coupling system 700 to an external shaft 705 (output); magnetic elements 735 on interface 730 (rotor) on shaft 305 within an enclosure of the heat pipe of the heat engine engage magnetic elements 715 of interface 710 with shaft 705 located outside of the enclosure of the heat pipe. According to any preferred embodiment, no components within the enclosure of the heat pipe of heat engine 210 (e.g. the sealed heat pipe of a partially-integrated heat engine) are exposed; none of the components of the generator system external to enclosure are exposed to the pressures and temperatures within the heat pipe of the heat engine. (As shown in FIG. 20D, a bearing system 602*d* for shaft 305 may also be provided within enclosure 210.) The magnetic coupling system may provide a rotational gear ratio, such that the external (driven) shaft or magnetic field rotates at a different rate than the driving rotor assembly; the ratio of rotation rates may be any integer multiple or rational fraction, such as 10×, 1/100×, or 3/8×. Examples of magnetic gearing providing such rotational rate ratios include products of Magnomatics Limited of Sheffield, United Kingdom. See also U.S. Pat. No. 3,301,091. Such integral magnetic gearing may allow a turbine or other rotary expander to operate in an optimum speed range while the generator operates in a different optimum speed range; for example, a small-diameter turbine may have an optimum speed of 180,000 RPM while the associated generator has an optimum speed of 3600 RPM. According to a particularly preferred embodiment, the components of magnetic systems may be of a type providing contactless and lubricant-free operation, as commercially available for example from Magnomatics Limited of Sheffield, United Kingdom (gearing systems), Magna Drive Corporation of Woodinville, Wash. (coupling systems), SKF AB of Goteborg, Sweden (active bearing systems), and other vendors.

Figure 21A:
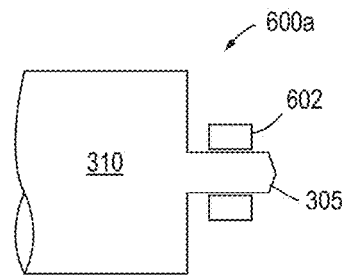
FIGS. 21A through 21F are schematic cross-section views of a bearing system for an expander-generator system of a heat engine according to an exemplary embodiment.

Referring to FIGS. 21A through 21F, according to exemplary embodiments, bearing systems for rotating elements such as shaft 305 of a expander 310 of the generator system (e.g. with generator 360) associated with the heat engine system are shown schematically. As shown in FIG. 21A, a bearing system 600*a* may comprise a set of bearings 602, for example, mechanical bearings (e.g. passive bearings). In certain applications, mechanical bearings may impose a practical or effective limitation on the maximum rotational speed of the turbine system and output shaft; according to an exemplary embodiment, magnetic bearings (e.g. active bearings) capable of effective operation at higher rotational speeds may employed in the generator system.

Figure 21B:
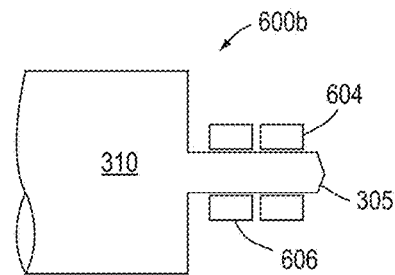

As shown in FIG. 21B, according to an exemplary embodiment, a bearing system 500*b* may comprise two sets of bearings, for example, a set of mechanical bearings 604 (passive bearings) and a set of magnetic bearings 606 (active bearings). Referring to FIG. 21F, a bearing system 600*f* may comprise a set of mechanical bearings 604 and a set of magnetic bearings 606 and a control system 620; control system 620 can be configured so that the mechanical bearings are in operation at a rotational speed below a designated threshold (and at start-up and shut-down of the system); by operation of control system 620, mechanical bearings 604 are disengaged and magnetic bearings 606 are activated at a rotational speed above the designated threshold. The use of a magnetic bearing system allows for higher (rotational) speed operation of the generator system and associated improvements in operational efficiency (e.g. through the reduction of friction by eliminating contact of certain moving parts and the associated efficiency losses); the presence of a mechanical bearing system allows for safe and efficient operation at lower speeds during start-up and shut-down and potentially as a backup system in the event of a malfunction of the system.

Figure 21C:
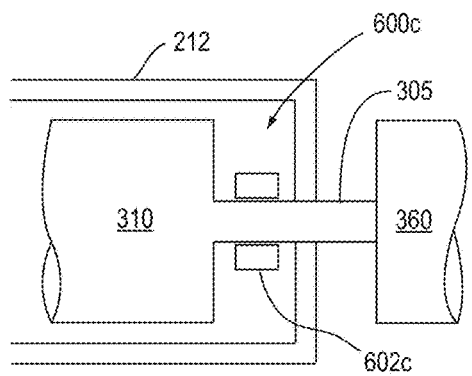

As shown schematically in FIG. 21C, a bearing system 600*c* may comprise a set of bearings 502*c* installed with expander 310 within heat pipe 212. According to a preferred embodiment, the bearing system will be configured to withstand (being sealed within) the environmental conditions within the heat pipe for a suitable period of time before failure (e.g. useful life). As shown in FIG. 21E, a bearing system 600*e* installed within heat pipe 212 may comprise a set of bearings 602*e* and a thermal management system 610 (e.g. comprising a heat exchanger such as a thermo-electric cooler) to protect the bearing system from high temperatures associated with the vapor phase of the working fluid (e.g. to extend the useful life of the bearing system).

Figure 21D:
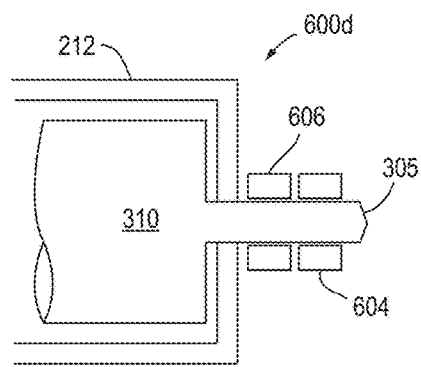
Figure 21E:
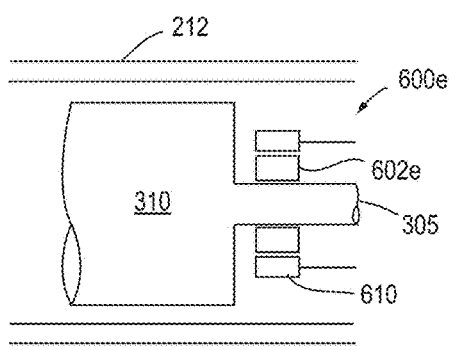
Figure 21F:
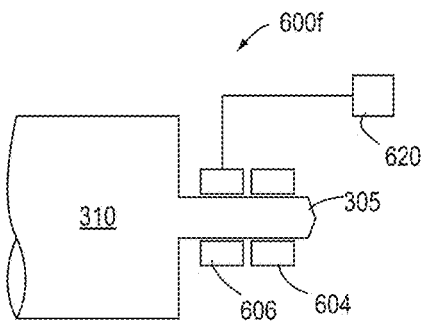

As indicated in FIG. 21D, a bearing system 600*d* may be installed outside and shielded/protected from the environmental conditions within heat pipe 212. As shown schematically in FIG. 21D, bearing system 600*d* may comprise two sets of bearings (e.g. mechanical bearings 504 and magnetic bearings 506) installed outside of heat pipe 212. According to other alternative embodiments, the bearing system may comprise other configurations of bearing sets (e.g. a set of bearings inside the heat pipe and a set of bearings outside the heat pipe).

Referring to FIGS. 22A through 22D, a heat engine 210 comprising a heat pipe with an installed expander 310 powered by vapor phase working fluid is shown; coupling systems for the rotating elements of the generator system associated with the heat engine system such a shaft 305 coupling a expander 310 to other equipment (such as a generator 360) are also shown schematically according to exemplary embodiments.

Figure 22A:
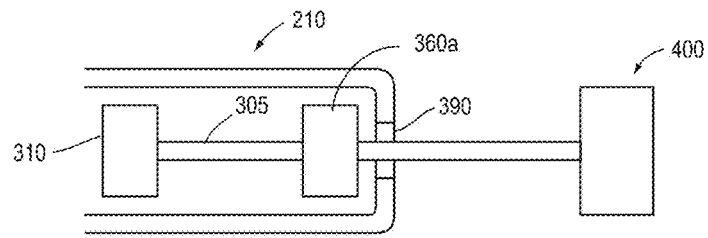
FIGS. 22A and 22B are schematic cross-section views of a heat engine with a directly-coupled expander-generator system according to an exemplary embodiment.

In FIG. 22A, a generator system associated with a heat engine is shown with a generator 360a and expander 310 installed within the heat pipe; generator 360a is coupled to an outlet 400 for distribution of power generated by the generator system. Generator 360a is coupled to expander 310 by a coupling system shown as mechanical shaft 305. Generator 360a and coupling system 305 must be configured to withstand the environmental/operating conditions within the heat pipe. A suitable dynamic seal (e.g. pressure seal) is provided for shaft 305 to pass through the shell of heat engine 210.

Figure 22B:
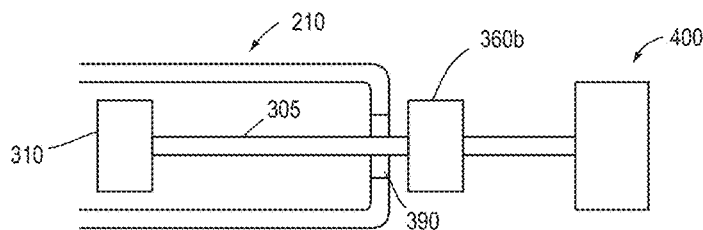

In FIG. 22B, a generator system associated with a heat engine is shown with a generator 360b installed outside of heat engine 210 and expander 310 installed within heat engine 210; generator 360b is coupled to outlet 400 for distribution of power generated by the generator system. Generator 360b is coupled to expander 310 by a coupling system shown as mechanical shaft 305. Generator 360b does not need to be configured to withstand the environmental/operating conditions within heat engine 210. A suitable dynamic seal 390 is required for rotating shaft 305 through the wall/shell of the heat pipe. Shaft 305 may by conduction transmit heat outside of the heat engine and components must be configured to withstand the associated (elevated) temperatures.

Figure 22C:
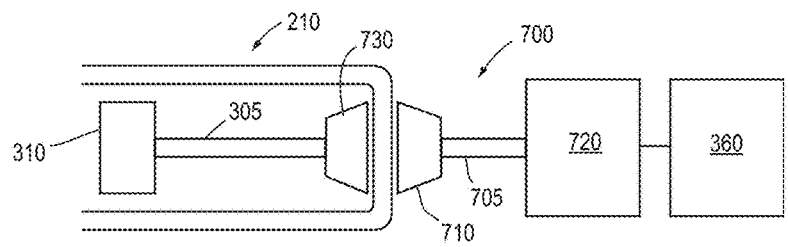
FIGS. 22C through 22E are schematic cross-section views of a heat engine with an indirectly-coupled expander-generator system to an exemplary embodiment.
Figure 22D:
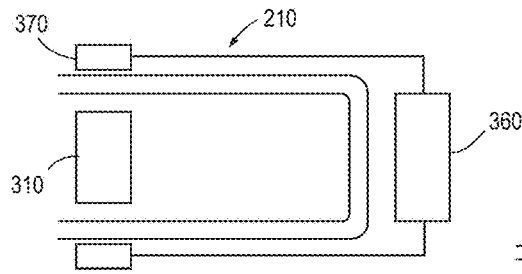
Figure 22E:
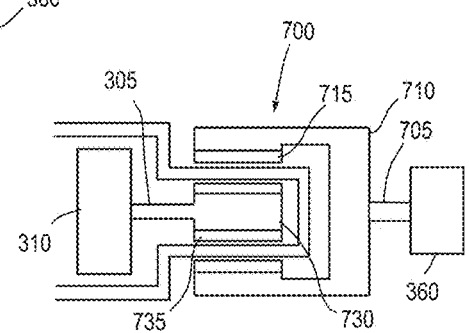

In FIGS. 22C and 22E, a generator system associated with a heat engine is shown schematically with a magnetic coupling system 700 coupled to expander 310 within heat engine 210. Rotating shaft 305 couples expander 310 to a magnetic coupling or interface 730 within heat engine 210. Interface 710 of magnetic coupling system 700 on the outside of the heat pipe engages interface 730 on the inside of the heat pipe without contact across a non-conducting end wall portion of the heat pipe. Interface 730 connected to expander 310 is coupled to interface 710 and to shaft 705 and magnetic gear system 720 of magnetic coupling system 700 to recover output rotational energy from the generator system associated with the heat engine system. As shown schematically in FIG. 22E (and FIGS. 20C and 20D), magnetic elements 735 interface 730 (within the heat pipe) engage magnetic elements 715 on interface 710 (external to the heat pipe) to transmit torque/rotation from (input) shaft 305 to (output) shaft 705. The coupling system does not require any mechanical connection of components/elements across the walls of the heat pipe; no associated seals are required for the shaft and heat pipe; the shell of the heat pipe of the heat engine may remain sealed and intact. See also FIG. 17H.

In FIG. 22D, a generator system associated with a heat engine is shown with a generator 360 outside of the heat pipe coupled to expander 310 within the heat pipe. Rotating elements of turbine system 210 (e.g. magnetic elements of a rotor) energize the wire coil of a stator 370 and transmit electrical energy to generator 360. The coupling system does not require any mechanical connection of components/elements across the walls of the heat pipe; no associated seals are required; the shell of the heat pipe may remain intact.

Figure 23A:
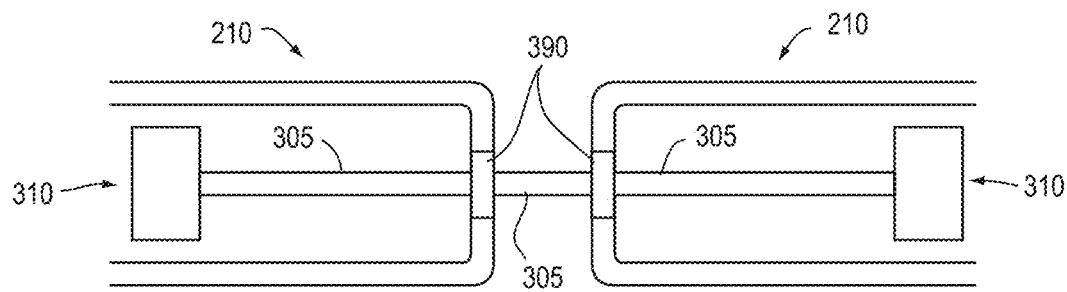
FIGS. 23A through 23C are schematic cross-section views of an interface of two heat engines in a heat engine system according to an exemplary embodiment.
Figure 23B:
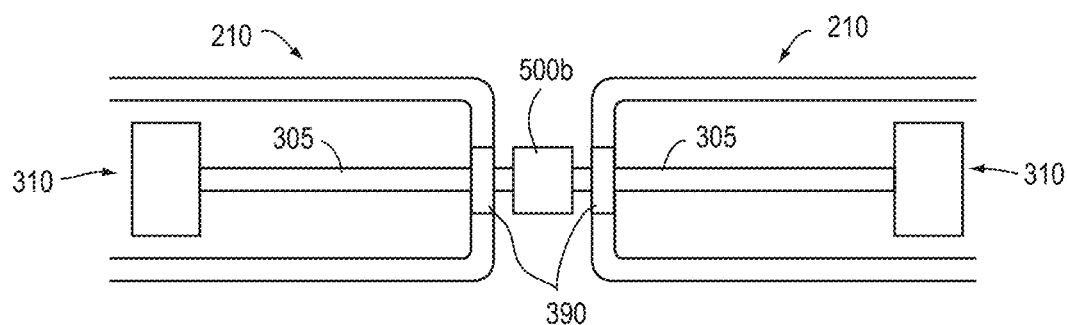
Figure 23C:
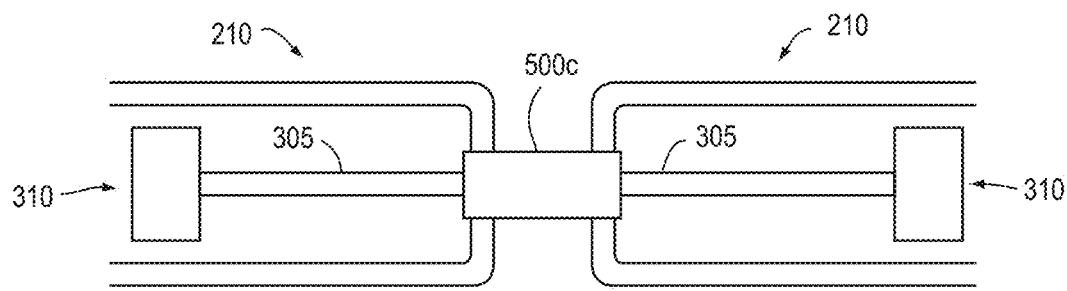

Referring to FIGS. 23A through 23C, a generator system associated with a heat engine 210 having two heat pipes for a corresponding heat engine coupled together in series is shown according to exemplary embodiments. As shown schematically, an expander 310 (e.g. turbo-machine) is installed within each heat pipe; the heat pipe for each heat engine is coupled through expander 310 by a common rotating shaft 305 (i.e. heat engines can be coupled at their respective condenser sections/ends or alternatively in series from condenser section of one heat pipe to evaporator section of the other). As shown schematically in FIG. 23A, shaft 305 coupling each expander 310 requires a dynamic seal 390 (e.g. a pressure-tight dynamic seal) suitable to allow passage of rotating shaft 305 through the end wall of each heat pipe 208 without allowing the escape of working fluid and or pressure drop in the heat tube of the heat engine. As shown schematically in FIG. 23B, a coupling system 500b coupled to rotating shaft 305 (e.g. a gearbox or clutch and/or with instrumentation and control system) can be installed between the seals 390 of each heat engine. As shown schematically in FIG. 23C, the seals and bearing system can be integrated into a combined coupling system 500c (which can be provided with an instrumentation and control system and thermal management system, etc.). As indicated in FIGS. 23B/23C with reference to FIG. 18A, the coupling system may be configured to allow the coupling of an output shaft and/or generator system between each heat engine.

According to any exemplary embodiment, the heat engine system may be arranged in any of a wide variety of configurations. According to an exemplary embodiment of the heat engine system, the heat engines may generally be identical in form and in operation. According to other exemplary embodiments, separate individual heat engines coupled in the heat engine system may have a different form or configuration. Each heat engine may operate under different operating conditions/ranges, such as temperature and pressure; each heat pipe may employ a different working fluid. The heat engines each may have a different construction (e.g. materials of construction) or a different configuration (e.g. of paths/passages and capillary structure and construction) or a different size (e.g. diameter and length).

As shown schematically in FIG. 24A, a heat engine 210 may include two expanders 310; as shown in FIG. 24B, in a series connection a heat engine 210v has a separate expander 310 and a heat engine 210w has a separate expander 310 (each coupled by a common rotating shaft 305). As shown, heat engines can be coupled in series on a common output shaft and configured so that the condenser sections of a set of adjacent heat engines abut and operate at the same rotational speed. According to an alternative embodiment, heat engines may be configured in series and staged so that the first heat engine in series operates at a higher temperature and is thermally coupled (as well as mechanically coupled) to the second heat engine in series which operates at a lower temperature (referenced to the condenser end of the first heat engine); the second heat engine in series may use a different working fluid or have a different internal form to compensate for the variations in operating conditions while achieving intended efficiencies of operation. According to other exemplary embodiments, the heat engines can be combined in series and/or in parallel to achieve operational efficiencies and to improve net performance.

The operation of the power generation system with a heat engine system is shown schematically in FIGS. 25A and 25B. The heat engine system comprises at least one heat engine; each heat engine comprising a heat pipe that contains a working fluid and has an evaporator section/end and a condenser section/end. Each heat engine has a passage for flow of vapor phase working fluid from the evaporator section to the condenser section and a flow path for return of liquid phase working fluid from the condenser section to the evaporator section. According to any exemplary embodiment of the power generation system, the heat engine will be comprise a generator and at least one expander (e.g. turbo-machine) will be installed within each heat pipe of the engine; the heat engine (operating in a continuous cycle) supplied with thermal energy from a heat source will power the generator system to generate electrical energy.

As shown in FIGS. 25A and 25B, a heat engine 210 is supplied thermal energy in the form of heat from heat exchanger 180 at the evaporator section to evaporate the working fluid into a vapor phase for flow through a central passage into the expander (e.g. turbo-machine) and then for return in liquid phase through a flow path inside of the walls of heat engine 210. As shown in FIG. 25A, a heat engine 210v may include a single-stage expander 310v having a single stage 320a. As shown in FIG. 25B, a heat engine 210w may include a multi-stage expander 310w having a first stage 320a and a second stage 320b and a third stage 320c. According to a preferred embodiment, each stage of the expander may share a common shaft; according to an alternative embodiment, each stage may operate at a different rotational speed on separate shafts (e.g. the first stage at 100,000 RPM, the second stage at 25,000-50,000 RPM, and the third stage at 10,000 RPM). According to another alternative embodiment, each stage may comprise a different type of expander (see, e.g., FIGS. 12A through 12H). Rotational energy from the expander 310w is transmitted to a generator 360 where it is converted into power supplied to an outlet such as a distribution network 400. According to an alternative embodiment, the generator system may comprise a micro-turbine with a compact alternator (e.g. configured similar to a brushless DC motor).

Figure 26:
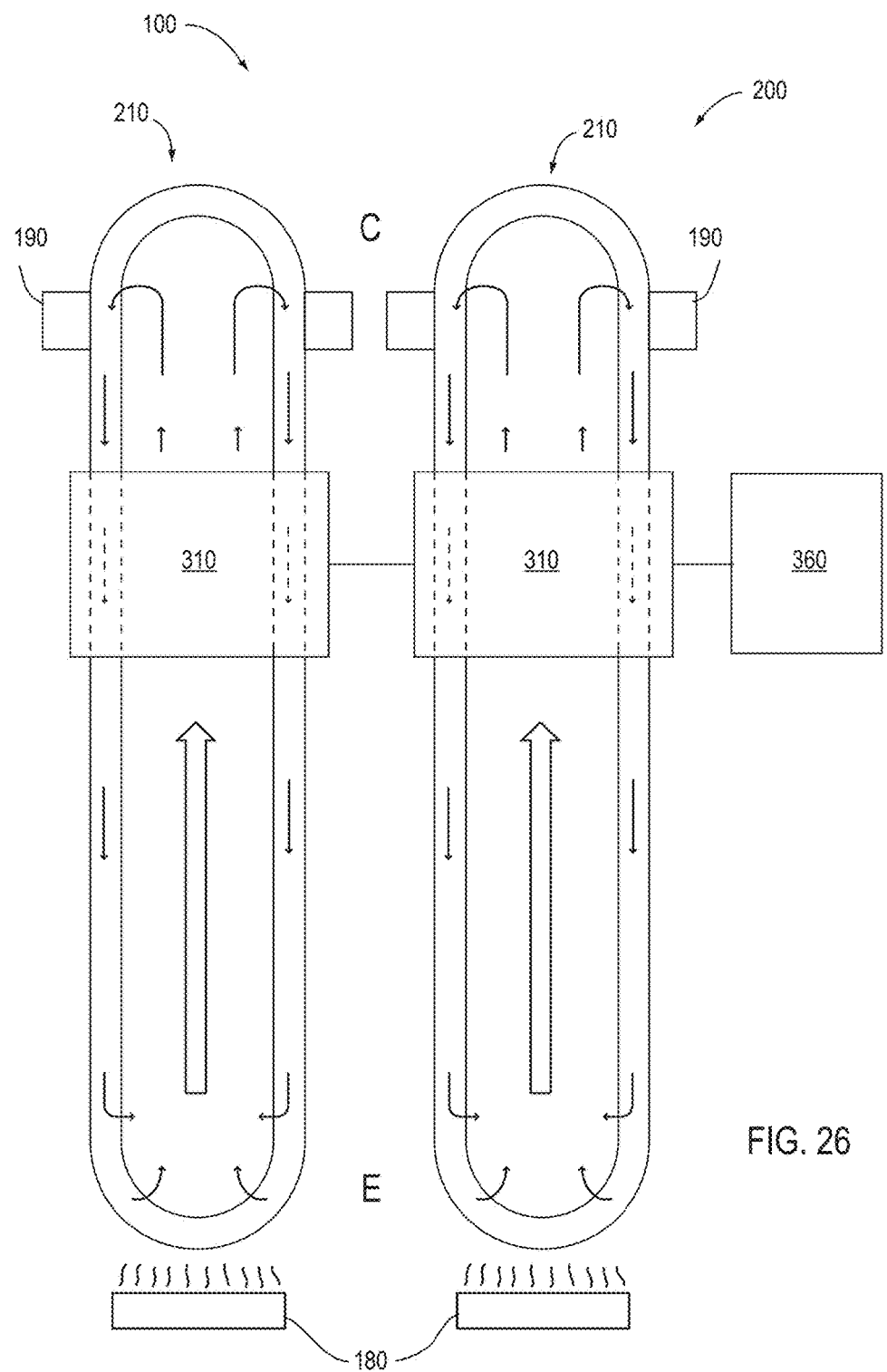
FIG. 26 is a schematic cross-section diagram of a heat engine system according to an exemplary embodiment.
Figure 27:
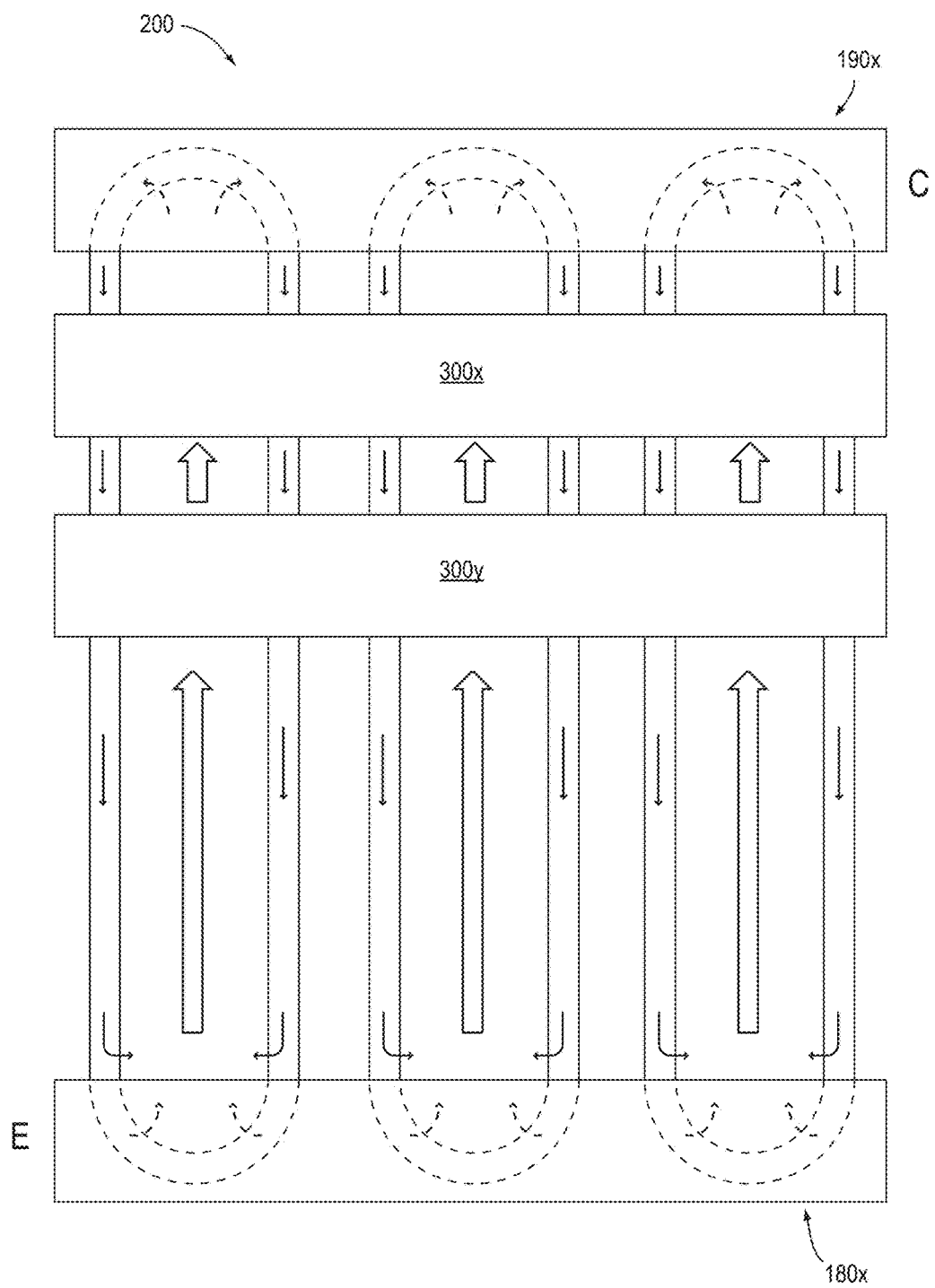
FIG. 27 is a schematic cross-section diagram of a heat engine system according to an exemplary embodiment.

As shown schematically in FIGS. 26 and 27, the heat engine system may comprise heat engines 210 operating in parallel. As shown in FIG. 26, thermal energy is supplied to the evaporator section of heat engines at heat exchanger 180; vapor phase working fluid powers an expander 310 in each of the heat engines; each of the turbine systems is coupled to a generation system 360. Each heat engine also comprises a heat exchanger at the condenser section to recover rejected heat from the thermal cycle within each heat engine. As shown in FIG. 27, the heat engine system comprises three heat engines that in parallel operate two generator systems 300x and 300y; the heat engines share at the evaporator section a heat source shown as heat exchanger 180x (to evaporate the working fluid into vapor phase for the turbine system) and share at the condenser section a heat exchanger 190x (where heat is rejected as the working fluid is condensed to liquid phase). According to an exemplary embodiment, the generator can be installed with the expander in the heat pipe of the heat engine between the evaporator section and the condenser section.

Figure 31:
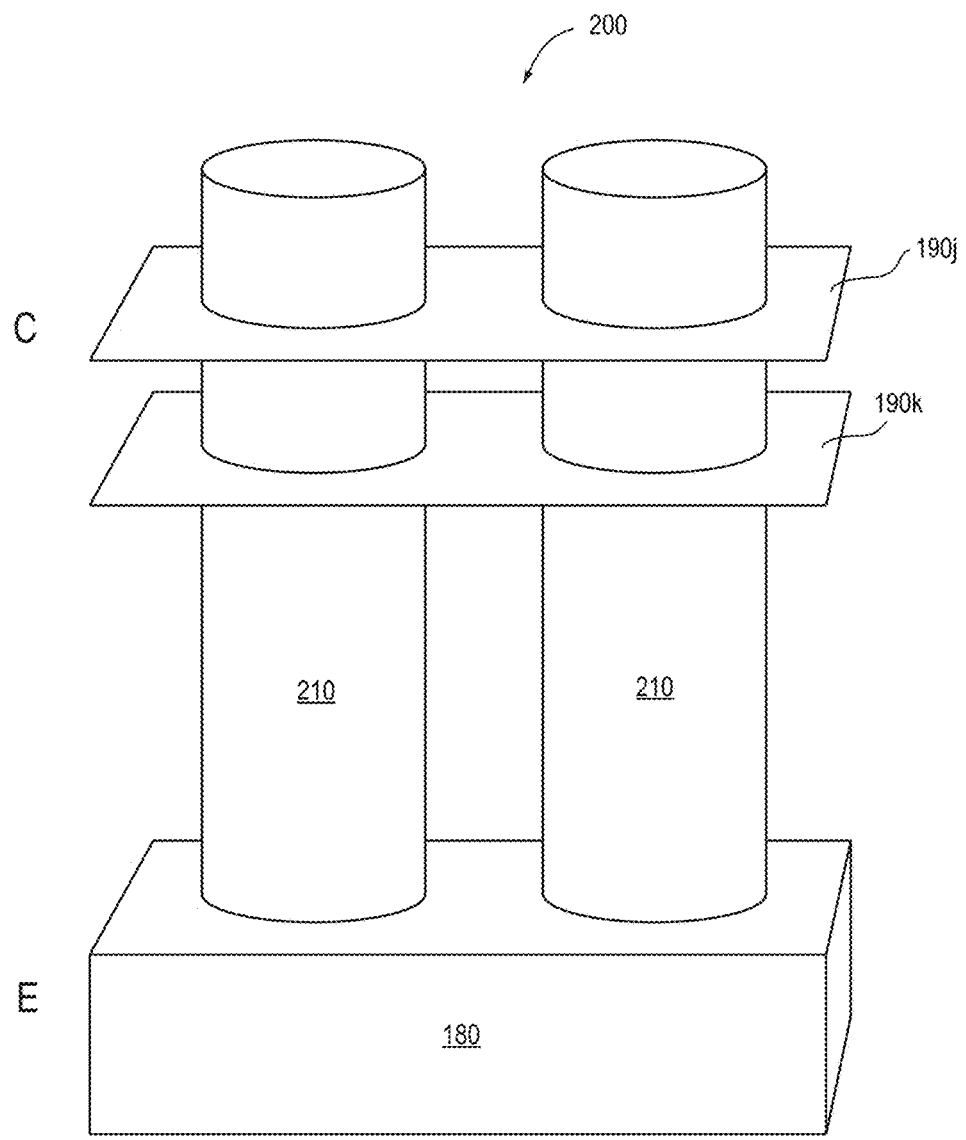
FIG. 31 is a schematic perspective view of a heat engine system according to an exemplary embodiment.

Referring also to FIG. 31, a heat engine system 200 is shown schematically comprising heat engines 210 having thermal energy supplied in the form of heat at the evaporator section by heat exchanger 180 (e.g. connected to a heat source) to produce vapor phase working fluid and having thermal energy rejected at the condenser section by heat exchanger 190j and heat exchanger 190k (e.g. using cold plates or fluid/water-cooled) to condense the working fluid into liquid phase for return to the evaporator section.

According to an exemplary embodiment, multiple heat engines may share a common heat exchanger which will tend to equalize the operating temperatures of the heat engines. According to another exemplary embodiment, a heat engine system may be configured so that the heat exchanger at the condenser section of one heat engine in the system operates as the heat exchanger at the evaporator section of another heat engine in the system (i.e. in thermal series) (with the heat pipes of each heat engine configured to operate efficiently over the resultant temperature ranges).

Figure 28A:
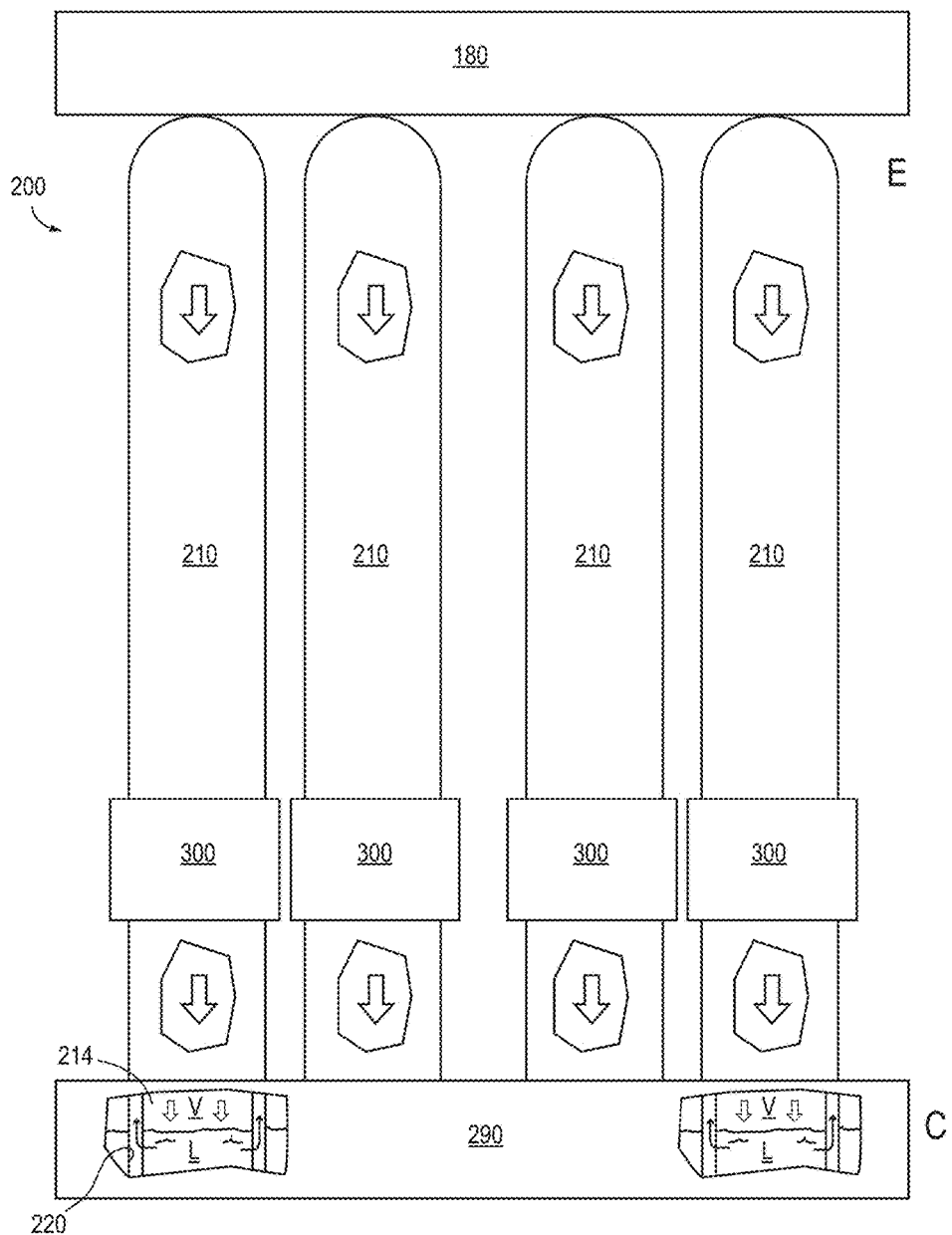
FIGS. 28A and 28B are schematic diagrams of a heat engine system according to an exemplary embodiment.
Figure 28B:
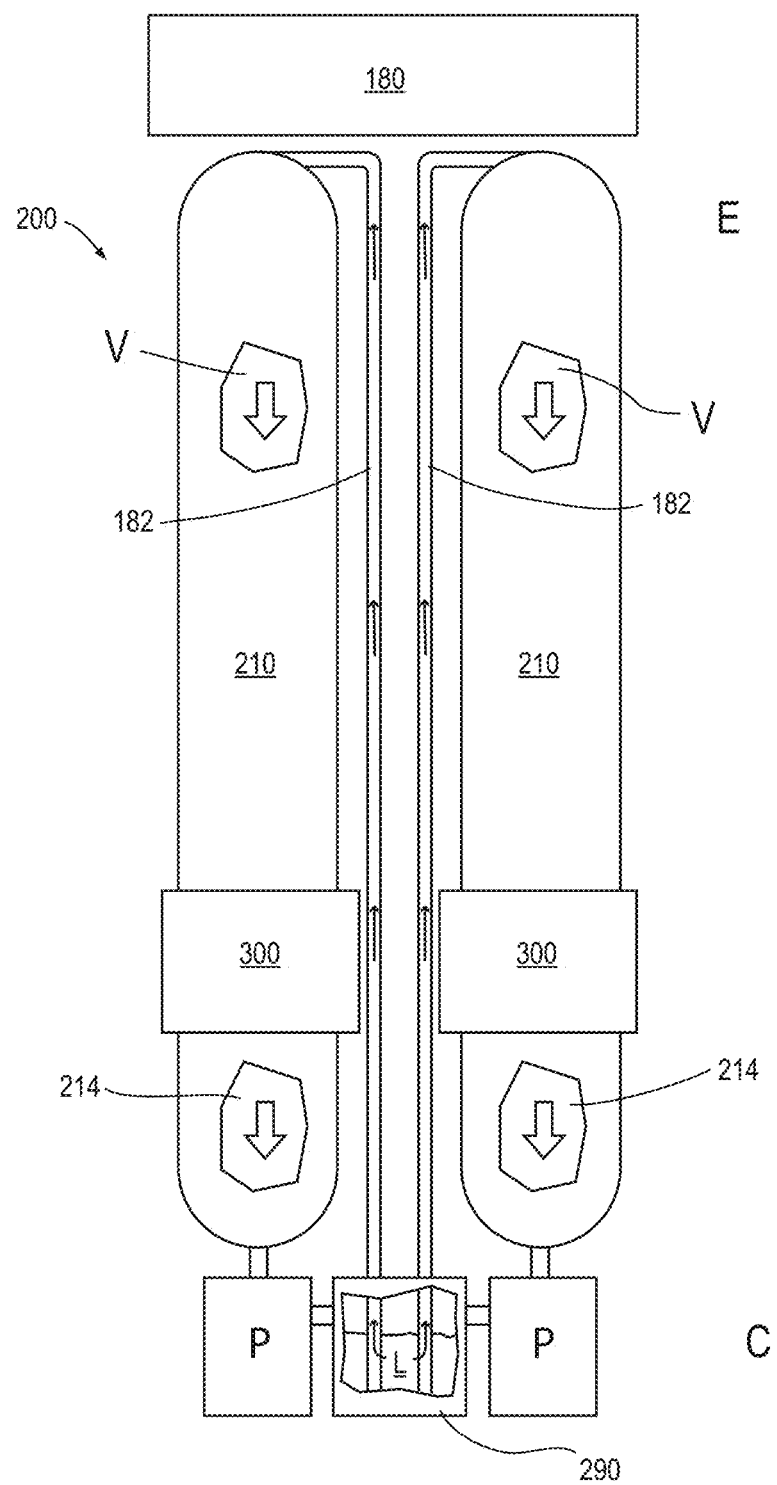

Referring to FIGS. 28A and 28B, a heat engine system 220 is shown having a reservoir 290 for working fluid supplying a set of heat engines 210. In operation of the thermal cycle of the heat engine system, heat exchanger 180 supplies thermal energy to heat the working fluid from liquid phase L to vapor phase V to flow within passage 214 from evaporator end E through a generator system 300 to condenser end C. As shown in FIG. 28A, working fluid is condensed to liquid phase L at condenser end C and accumulates within reservoir 290 where by capillary forces the liquid will enter a capillary structure shown as flow path 220 within the heat pipe and return from the condenser end C to the evaporator end E. As shown in FIG. 28B, working fluid is condensed to liquid phase at low pressure at condenser end C and by a pump P pumped to an intermediate pressure into reservoir 290 where the liquid L will enter a capillary structure shown as tube 182 and flow into evaporator end E where the working fluid is evaporated to vapor phase at high pressure. (The pump supplies a portion of the pressure differential between the low pressure at the condenser section and the intermediate pressure in the reservoir; the capillary structure must be configured to support the remaining pressure differential between the intermediate pressure in the reservoir and the high pressure at evaporator end E.) According to a preferred embodiment, the thermal cycle and flow of working fluid from condenser end to evaporator end across the expander will operate substantially continuously. According to an exemplary embodiment, the heat engine system can be configured to use gravity to facilitate the operation, for example, to assist with the accumulation or flow of the liquid phase working fluid. According to an alternative embodiment, the system may be configured to operate in an artificial gravity or reduced-gravity or gravity-free environment (e.g. as may be encountered in a spacecraft).

Figure 29A:
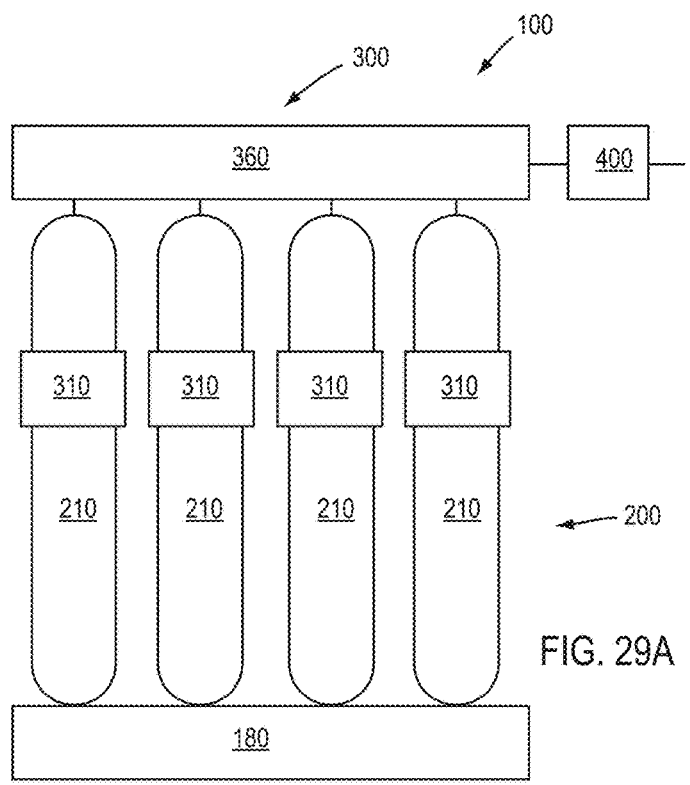
FIGS. 29A and 29B are schematic diagrams of a heat engine system according to an exemplary embodiment.
Figure 29B:
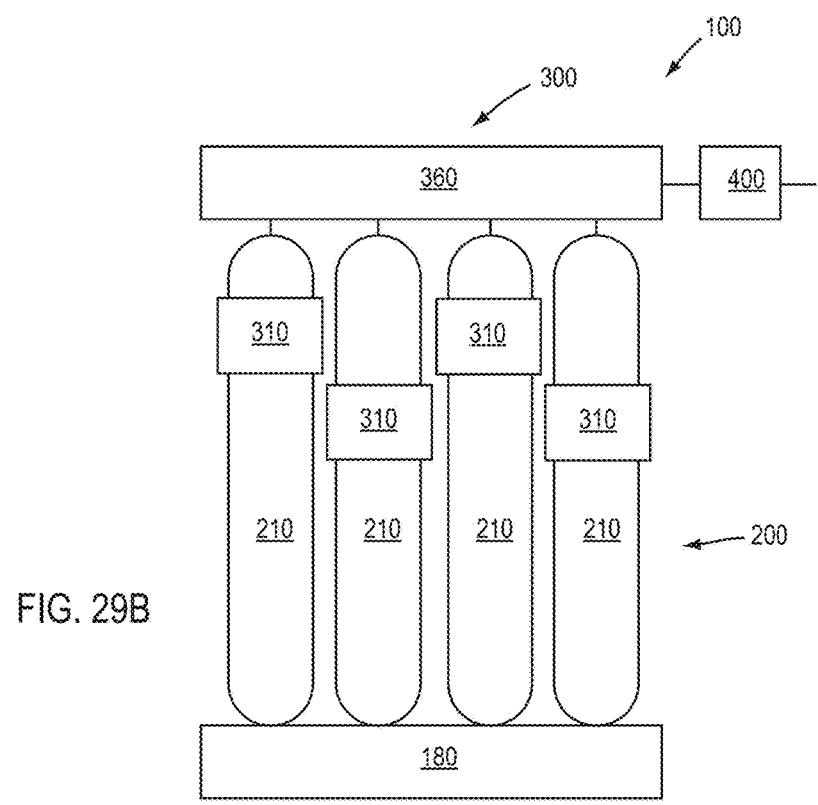

Referring to FIGS. 29A and 29B and 30A through 30E, a power generation system with a heat engine system 200 and generator system 300 is shown schematically according to exemplary embodiments. As shown in FIGS. 29A and 29B, heat engine system 200 comprises a heat engine array having four heat engines 210 in parallel receiving thermal energy from a common heat exchanger/source 180; generator system 300 comprises a set of expanders 310 powered by the working fluid within the heat tube of each heat engine and coupled to a common generator 360. According to an exemplary embodiment shown in FIG. 29B, the heat engine array is configured with the expanders for each adjacent heat engine in a staggered orientation so that the heat engines may be located in a more compact arrangement (which reduces the size of the array in comparison with the embodiment shown in FIG. 29A).

Figure 30A:
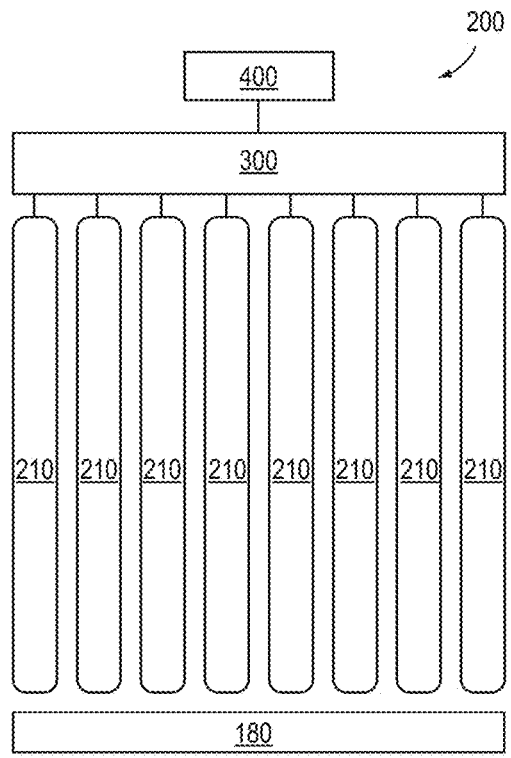
FIGS. 30A through 30E are schematic block diagrams of a heat engine system according to an exemplary embodiment.
Figure 30B:
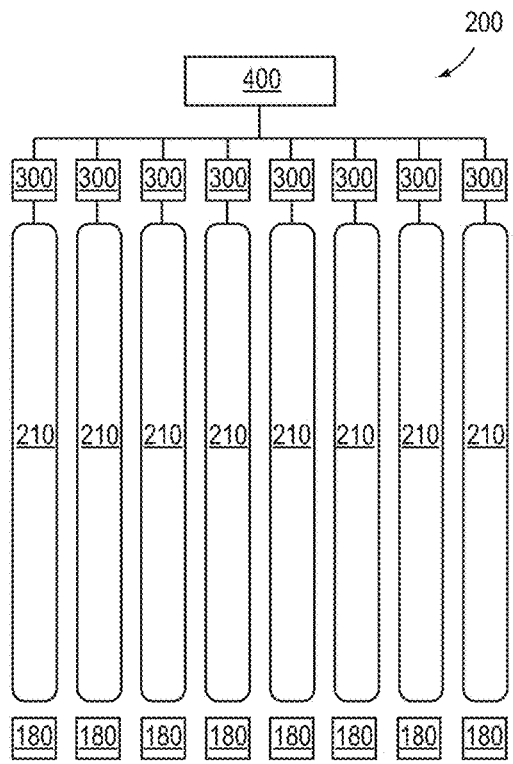
Figure 30C:
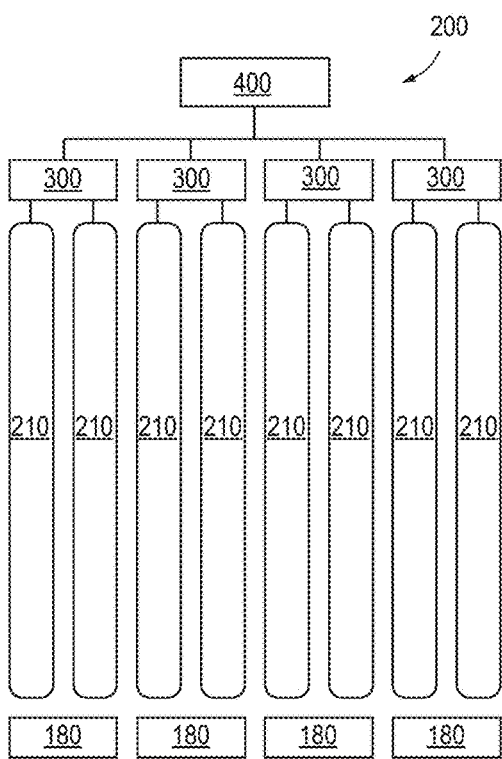
Figure 30D:
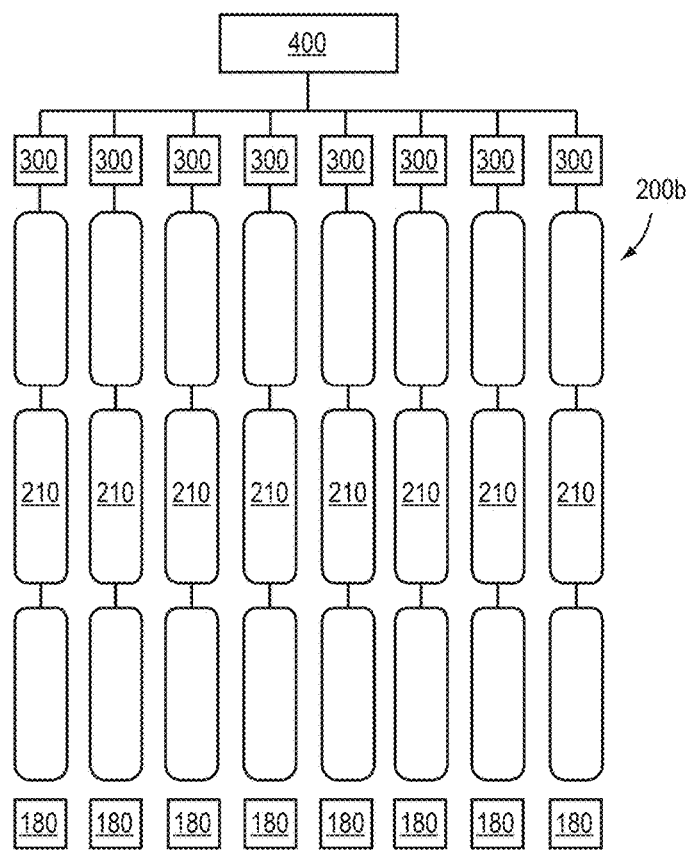
Figure 30E:
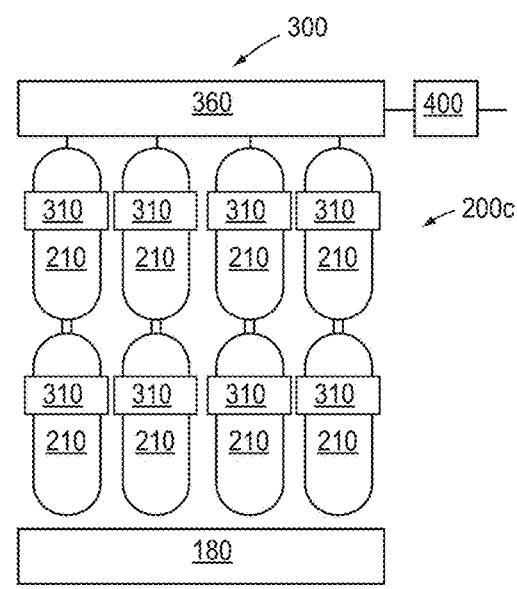

In FIGS. 30A through 30C, the system comprises a heat engine system 200 with a heat engine array having eight heat engines 210; the heat engine array is arranged to provide in-parallel sets of heat engines receiving thermal energy from a common heat exchanger/source 180 (FIG. 30A) from and individual corresponding heat source 180 (FIG. 30B) or from paired/shared heat source 180 (FIG. 30C). The systems also comprise a generator system 300 having a set of expanders 310 (e.g. a turbo-machine for each heat engine 210) coupled to a generator 360 delivering power to a distribution system 400. In FIG. 30D, the heat engine system 200 comprises a heat engine array with twenty four heat engines 210 arranged in eight parallel rows of three in-series heat engines. In FIG. 30E, a compact heat engine system is shown having an array with a total of eight heat engines (four rows of two in-series heat engines). As shown in FIGS. 30A and 30E, heat engine system 200 comprises an array of heat engines 210 that share a common heat exchanger system 180 and a common generator system 300. As shown in FIG. 30D, each heat engine 210 has a corresponding individual heat exchanger 180 and turbo-generator 300.

Each heat engine system 200 is connected to a generator system 300 (which will include associated power conditioning and conversion circuitry). As shown in FIGS. 30A and 30E, the heat engines 210 contribute to a common generator system; as shown in FIGS. 30B and 30D, each heat engine 210 (in a series) contributes to an individual generator; as shown in FIG. 30C, a set of two heat engines contribute to a shared generator system. Each generator system 300 is connected to the distribution network 400.

Figure 33A:
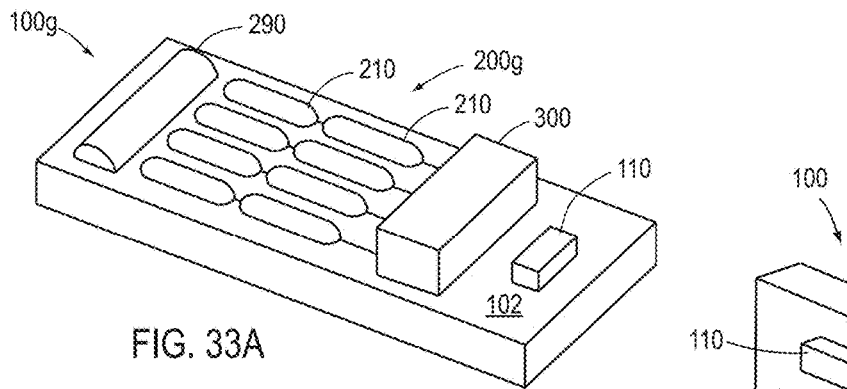
FIGS. 33A and 33B are schematic perspective views of a heat engine system according to an exemplary embodiment.
Figure 33B:
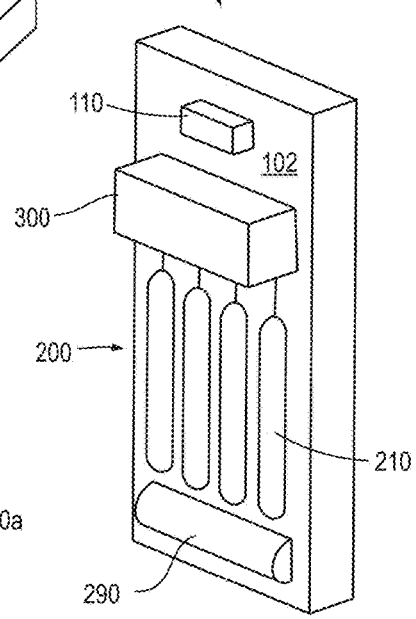

Referring to FIGS. 33A and 33B, the power generation system 100 is shown having a base 102 onto which components are installed, for example, the heat engines 210, generator system 300 and instrumentation and control system 110. In FIG. 33A, base 102 is oriented in a horizontal direction. In FIG. 33B, base 102 is oriented in a vertical direction (e.g. as for mounting on a wall). Referring to FIG. 33A, the heat engine array of the heat engine system 200 comprises heat engines 210 both in parallel and in series.

According to an exemplary embodiment, the heat engines in parallel may be configured so that the temperature at the evaporator end of a heat engine is substantially the same as the temperature at the evaporator end of the adjacent heat engine (or heat engines); the heat engines in series may be configured end to end so that the temperature at the condenser end of a heat engine is substantially the same as the temperature at the evaporator end of the adjacent heat engine; the working fluid and capillary structure configuration of each heat engine can be modified for the operating conditions (e.g. including pressure, temperature and the heat of vaporization of the working fluid). According to an exemplary embodiment, the individual heat engines within the array may be identical or substantially identical in configuration; a heat engine array may have a modular construction that includes common elements such as heat engines that can be removed and replaced interchangeably (See, e.g., FIG. 34). According to an alternative embodiment, the individual heat engines may receive thermal energy from different sources and may be operated under different conditions and/or using a different working fluid; the individual heat engines may have a different configuration or structure.

According an exemplary embodiment of the power generation system, each the turbine system and generator system will be configured to generate a direct current (DC) voltage; the DC voltage from each generator system can at distribution system 400 (i.e. cumulatively) be converted to an alternative current (AC) voltage for transmission. According to alternative embodiments the generator system may comprise an AC generator (i.e. generating an AC voltage). According to an alternative embodiment, the generator system may employ a micro-turbine (within the heat engine) and a compact generator (inside or exterior to the heat engine). According to any preferred embodiment, the power generation system will be configured to use conventional power generation equipment for the generator system.

Figure 32A:
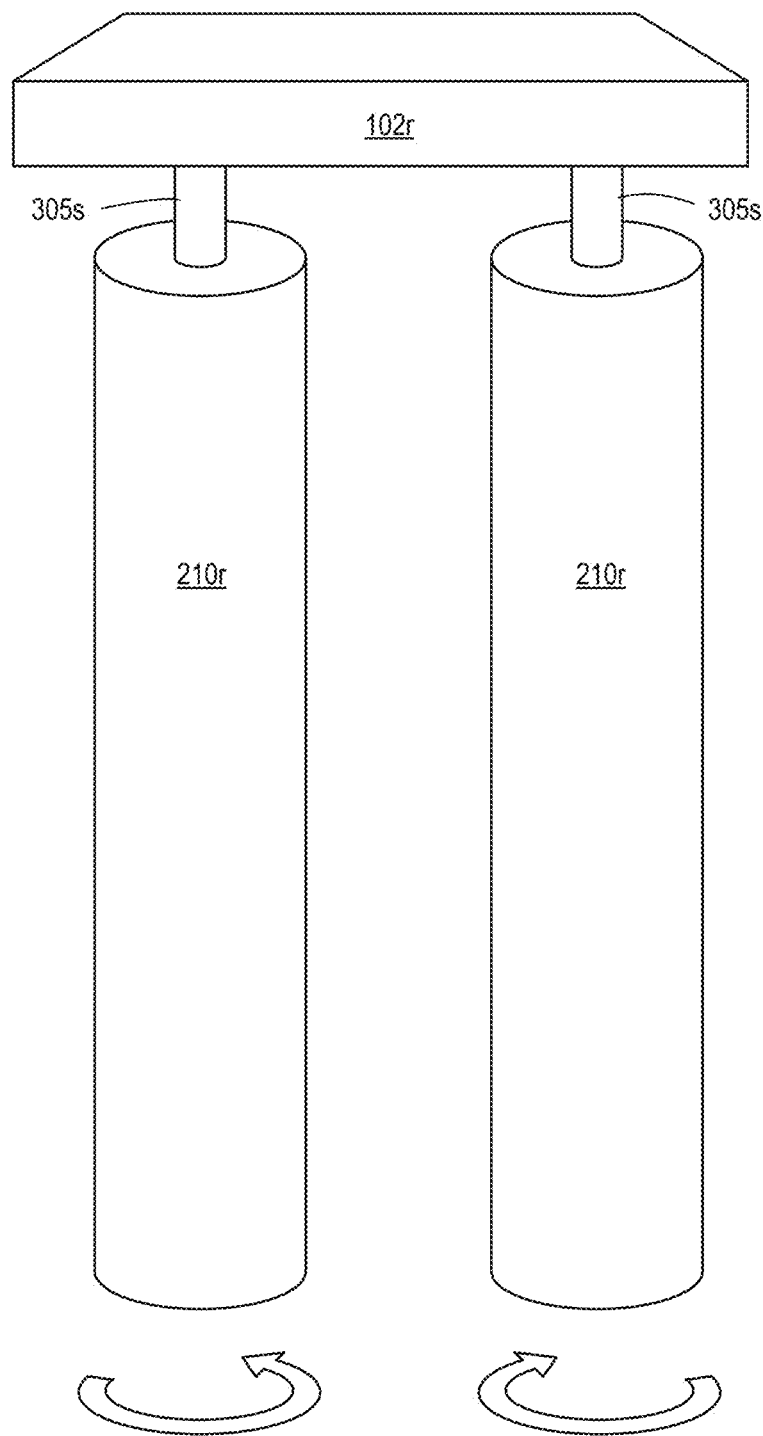
FIG. 32A is a schematic perspective view of a heat engine system according to an exemplary embodiment.
Figure 32B:
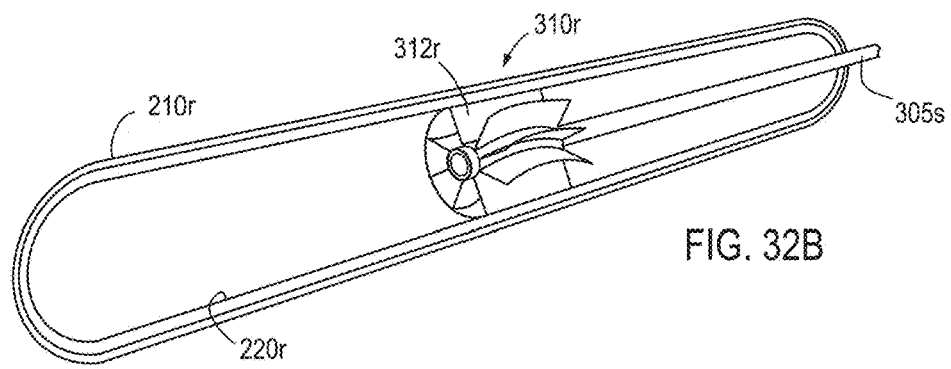
FIG. 32B is a schematic cross-section perspective view of a heat engine according to an exemplary embodiment.
Figure 32D:
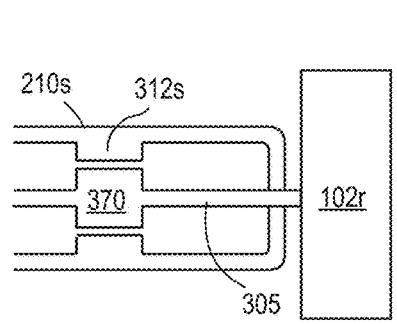
FIGS. 32C through 32H are schematic cross-section diagrams of an expander-generator system for the heat engine system according to an exemplary embodiment.
Figure 32C:
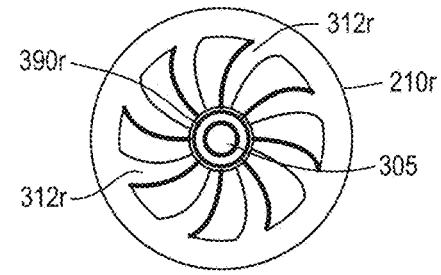
Figure 32E:
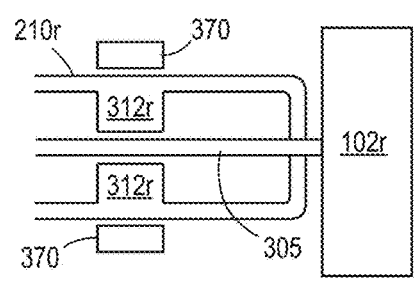
Figure 32F:
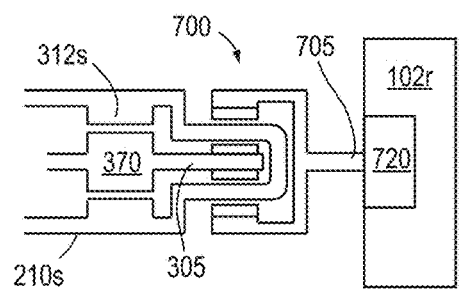
Figure 32G:
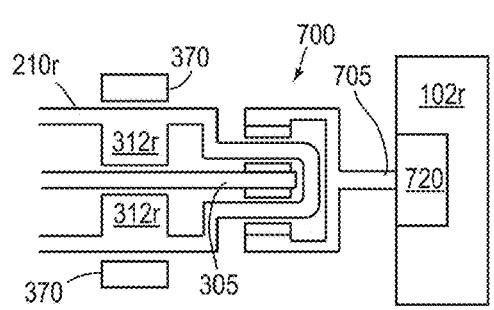
Figure 32H:
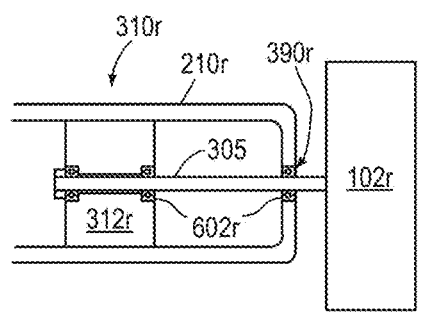

Referring to FIGS. 32A through 32H, a heat engine system is shown schematically according to an alternative embodiment in which heat engines 210r are attached to a base 102r by a shaft 305s; in operation, heat engines 210r rotate and shaft 305s is fixed relative to base 102r (as indicated, alternate heat engines in the array may be configured to rotate in opposite directions to reduce net gyroscopic effects). According to an exemplary embodiment, the heat engines may be designed (e.g. shaped and configured) so that rotation of the heat engine (e.g. in a range of speeds below 10,000 RPM to above 100,000 RPM) induces by centrifugal force a pumping effect that facilitates the flow of the working fluid within the heat pipe. As shown schematically in FIG. 32B, a expander 310r installed within heat engine 210r; as shown in FIG. 32C, turbine blades 312r of expander 310r are fixed to the interior of heat engine 210r; flow of vapor phase working fluid through expander 310r acting on turbine blades 312r induces heat engine 210r to rotate around shaft 305s on bearings 602r; as shown in FIG. 32H, shaft 305s extends from the end of heat engine 210r through a dynamic seal and bearing 390r and is mounted to base 102r. As shown in FIG. 32B, a flow path shown as capillary structure 220r is provided along the inside wall of heat engine 210r and around expander 310r. As shown schematically in FIGS. 32D and 32F, a stator 370 of the generator system may comprise a cylinder attached to shaft 305; as shown schematically in FIGS. 32E and 32G, according to an alternative embodiment, stator 370 of the generator system may comprise a ring installed around the exterior of heat engine (having an exterior wall made of a non-conducting material). As shown in FIGS. 32F and 32G, according to an alternative embodiment, shaft 305 of rotating heat engine 210r may be fixed to base 102r without requiring any portion of shaft 305 to extend through the end wall of heat engine 210r; a magnetic coupling system 700 secure shaft 305s is secured (through non-conducting material and) through an interface or magnetic coupling to a shaft 705. In operation, when the magnetic coupling system is engaged, the internal shaft 305 and the magnetic gear system 720 are engaged, magnetic gear system 720 can operate as a brake or lock to retain shaft 305 in a fixed position while heat engine 210r rotates around fixed shaft 305 (see FIG. 32A).

Figure 34:
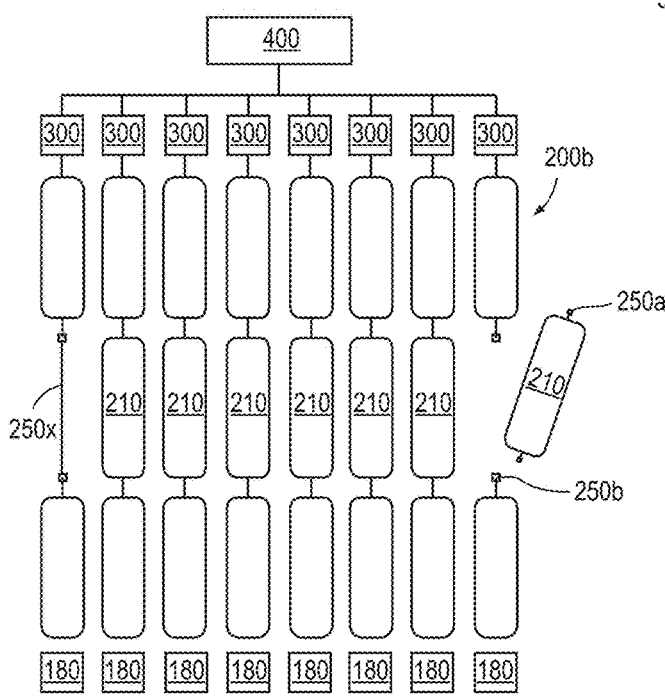
FIG. 34 is a schematic block diagram of a heat engine system with modular heat engine units according to an exemplary embodiment.

Referring to FIG. 34, a system is shown with a heat engine array using modular components. As shown, an individual heat engine can be removed and replaced (e.g. when expended or no longer improper or suitable operation, or for periodic testing/evolution, etc.). According to an exemplary embodiment, the system can be configured to remain in (partial) operation during removal/replacement of an individual heat engine; couplings 250a and 250b for the heat engine can facilitate the efficient disconnection/removal and connection/installation of a heat engine. As shown, a bypass module 250x can be provided for the array when a heat engine is removed but there is no replacement heat engine; the bypass module can be configured to transmit torque/rotational energy and/or working fluid through the array.

Figure 35:
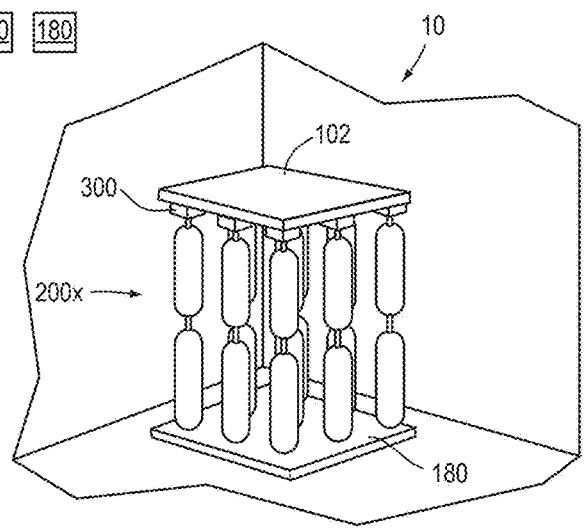
FIG. 35 is a schematic perspective view of a heat engine array of a heat engine system installed in a facility according to an exemplary embodiment.

Referring to FIG. 35, the heat engine system is shown having a set of heat engines configured in a three-dimensional array 200x. The heat engines share a common heat source 180 and a common platform shown as base 102. The array is shown with heat engines in series and parallel (i.e. a 2×3×3 array). According to a preferred embodiment, the array will have a compact form to facilitate efficient operation and use in wide variety of facility types, such as a commercial, industrial, residential, medical, office or other facility having a room 10. According to other exemplary embodiments, the array may be configured in other combinations of parallel and/or series heat engines. As shown, arrangement of the heat engines in a three-dimensional array will allow convenient installation of the system in a facility close or adjacent to a heat source and/or close to a location where generated electric power is to be used. According to an exemplary embodiment, the array can be constructed using modular heat pipe units (e.g. sealed units) that are coupled thermally (e.g. by heat exchangers) and mechanically and/or electrically/magnetically (e.g. by a magnetic coupling system with magnetic gearing system and magnetic bearing system).

Figure 36:
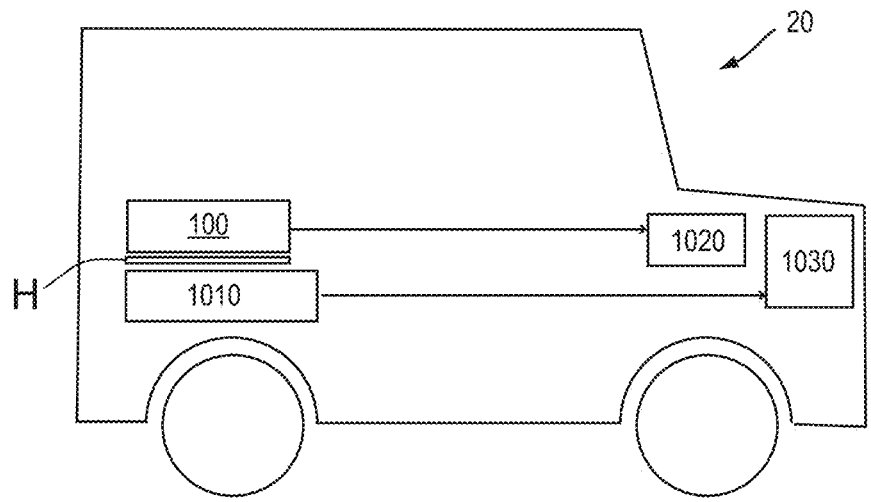
FIG. 36 is a schematic diagram of a vehicle with a heat engine system according to an exemplary embodiment.
Figure 37:
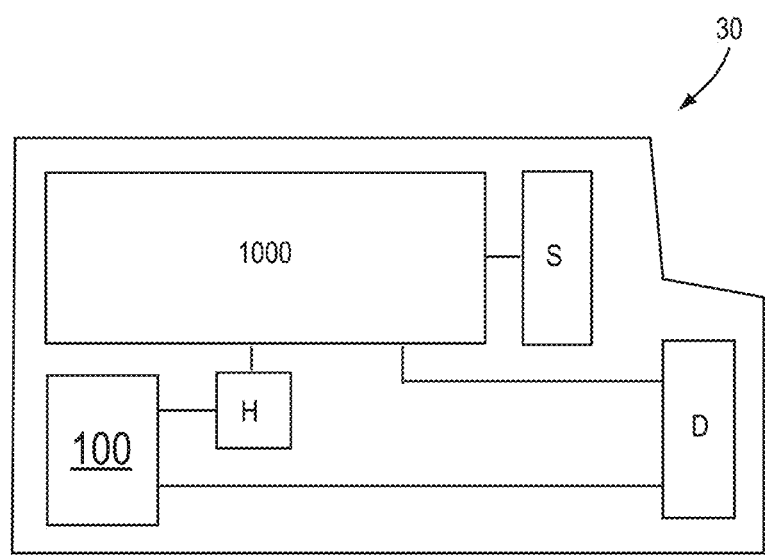
FIG. 37 is a schematic diagram of a facility or vehicle with a heat engine system according to an exemplary embodiment.

Referring to FIGS. 36 and 37, example applications of a power generation system 100 with heat engine system are shown schematically according to exemplary embodiments. As shown in FIGS. 36 and 37, a heat source H provides thermal energy for power generation system 100 (e.g. through heat exchanger system 180 shown in FIG. 1). According to exemplary embodiments, the heat engine system of the power generation system can be configured to use heat/thermal energy from any of a wide variety of sources (individually or in combination), for example, waste heat from a power plant operation, waste heat from engine or power plant exhaust, solar-generated thermal energy, geothermal energy, etc. According to a particularly preferred embodiment, the power generation system will be installed adjacent or near to a power plant; waste heat from the power plant will be a conveniently-available source of thermal energy for the heat engine system of the power generation system.

As shown in FIG. 36, power generation system 100 can be installed in a vehicle 20. The vehicle may be a commercial vehicle (e.g. for transport of cargo), a work vehicle (e.g. for construction, agriculture, etc.), a passenger vehicle (e.g. personal/family car), a commercial passenger transport (e.g. taxi, shuttle, van, bus, etc.), rail transport (e.g. train for cargo and/or passengers, subway, trolley, elevated rail, monorail, etc.), or any other type of vehicle. According to an exemplary embodiment, the vehicle includes vehicle systems such as a drive system/transmission, battery system or other system for propulsion of the vehicle; the vehicle also includes other power systems such as a vehicle electrical system; the vehicle may also include auxiliary power systems (e.g. internal to the vehicle or connected external to the vehicle, such as equipment, appliances, accessories, etc.). As shown schematically, vehicle 10 includes a power plant 1010 (e.g. a combustion engine, electric motor system or other type of vehicle power plant) supplying power to vehicle systems 1030 (e.g. comprising the drive system, electrical system, auxiliary systems, etc.). Power generation system 100 is configured to supply power to vehicle systems 1020 (e.g. comprising a drive system, electrical system, auxiliary systems, etc.). For example, according to an exemplary embodiment where the vehicle is a hybrid-electric vehicle, power plant 1010 may comprise an internal combustion engine and vehicle systems 1030 comprise a drive train for the vehicle; vehicle systems 1020 may comprise an electric motor system with a battery system that is powered power generation system 100. As indicated, any substantial source of heat in or on or in association with the vehicle may be a potential source of thermal energy for the heat engine system of the power generation system. According to a preferred embodiment, waste heat from the vehicle power plant will be a primary source of heat for the heat engine system; according to an alternative embodiment, solar-generated thermal energy may comprise a source of heat for the heat engine system.

As shown in FIG. 37, power generation system 100 may be installed in a vehicle or facility 30. The facility may be any type of facility, such as a power plant, an industrial plant, commercial building, storage location, office building, government facility, recreational/entertainment venue, school/educational facility, residential building, home, etc. Facility 20 comprises a power plant 1000 with a source of fuel or energy S. Power plant 1000 comprises a source of heat H for the heat engine system of power generation system 100. Power plant 1000 and power generation system 100 provide energy to a system D for distribution and use within the facility and/or for delivery to other locations outside of the facility. According to a particularly preferred embodiment, the facility is a power plant (e.g., an electric generation station powered by coal, natural gas, oil, nuclear energy, wind, solar energy, etc.) that supplies waste heat as the source of thermal energy for the heat engine system of the power generation system.

According to any preferred embodiment, the heat engine array and individual heat engines may be configured as needed according to the desired or intended operating conditions, availability of thermal energy, output requirements, etc. Individual heat engines or portions of the array of heat pipes may be configured to operate over varying operating conditions with varying working fluids and may have varying materials of construction, varying configurations of the passage for the vapor phase working fluid (see, e.g., FIGS. 7A through 7G, 14A and 14B and 15A and 15B), varying configurations of the capillary structure (see, e.g., FIGS. 3B through 3J, 5A through 5C and 6A through 6N), varying expander/turbo-machine configurations (see, e.g. FIGS. 14C, 12A through 12H), varying generator system configurations (see, e.g., FIGS. 16A through 16C, 17D through 17F, 18A and 18B and 30A through 30E), varying seal/bearing and coupling/power transmission configurations (see, e.g. FIGS. 19, 20A through 20D, 21A through 21F, 22A through 22E, and 23A through 23C), in varying uses and applications (see, e.g. FIGS. 35, 36 and 37), etc.

It is important to note that the construction and arrangement of the elements of the inventions as described in system and method and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, variations in the arrangement or sequence of process/method steps, operating conditions and arrangement of the preferred and other exemplary embodiments without departing from the spirit of the present inventions.

The invention claimed is:

1. A heat engine system comprising:
   at least one heat engine comprising at least one heat pipe;
   a generator assembly comprising an expander and a generator;
   wherein the at least one heat pipe contains a working fluid and comprises an evaporator section and a condenser section;

wherein the at least one heat pipe has a capillary structure for the flow of working fluid in liquid phase from the condenser section to the evaporator section;
wherein the expander is installed within the at least one heat pipe;
wherein the expander is coupled to the generator by a coupling system that includes a magnetic coupling between the expander and the generator, the magnetic coupling including a first rotating member within the at least one heat pipe and a second rotating member outside the at least one heat pipe and magnetically coupled to the first rotating member; and
wherein the capillary structure comprises a first capillary region adjacent the evaporator section having a first feature size and a second capillary region adjacent the condenser section having a second feature size, wherein the first feature size is smaller than the second feature size and gradually changes from the first feature size to the second feature size.

2. The system of claim 1 wherein the generator assembly generates electrical power.

3. The system of claim 1 wherein the expander comprises a turbine system within the heat pipe.

4. The system of claim 3 wherein the turbine system comprises a multistage turbine within the heat pipe.

5. The system of claim 3 wherein the generator assembly is at least partially installed within the heat pipe.

6. The system of claim 1 further comprising a heat engine array with a first heat pipe and a second heat pipe.

7. The system of claim 6 wherein a shaft couples an expander within the first heat pipe to an expander within the second heat pipe.

8. The system of claim 1 wherein the generator assembly comprises a bearing system with bearings mounted on a rim for a shaftless rotor of the expander.

9. The system of claim 1 wherein the expander comprises a turbine system.

10. The system of claim 1 comprising a bearing system for the generator assembly.

11. The system of claim 1 wherein the capillary structure comprises a passage asymmetrically around an axial turbine system.

12. The system of claim 1 wherein the expander comprises multiple turbines within the heat pipe.

13. The system of claim 1 comprising a first passage within the heat pipe and a second passage external to the heat pipe for the working fluid in vapor phase.

14. The system of claim 1 wherein the heat engine system comprises a first evaporator section and a second evaporator section.

15. The system of claim 1 wherein the heat engine system comprises a first condenser section and a second condenser section.

16. The system of claim 1 wherein the heat engine system comprises a heat pipe with a chamber at the evaporator section and at the condenser section.

17. The system of claim 1 further comprising a common reservoir to provide flow return for the working fluid to the evaporator section of the at least one heat pipe.

18. The system of claim 17 further comprising a pump to increase a pressure differential of the working fluid supplied to the evaporator section.

19. The system of claim 1 wherein each heat engine comprises a first heat pipe with a first operating temperature range in thermal series with a second heat pipe with a second operating temperature range below the first operating temperature range.

20. The system of claim 19 wherein the first heat pipe comprises an expander-generator and the second heat pipe comprises an expander-generator.

21. The system of claim 20 wherein the first heat pipe and the second heat pipe are coupled by a shaft.

22. The system of claim 20 wherein a turbine system of the first heat pipe and a turbine system of the second heat pipe are coupled by a coupling.

23. The system of claim 22 wherein the coupling is a magnetic coupling.

24. The system of claim 22 wherein the coupling comprises a gear system.

25. The system of claim 22 wherein a rotor of the first expander and a rotor of the second expander share a common shaft.

26. The system of claim 1 wherein the generator assembly comprises multiple generators.

27. The system of claim 1 wherein the generator assembly comprises a magnetic gear system.

28. The system of claim 1 wherein the heat pipe comprises an internal rotary turbine.

29. The system of claim 28 wherein the internal rotary turbine comprises an integral tip magnet.

30. The system of claim 28 wherein the internal rotary turbine comprises a rotor and a stator with separate ring magnets.

31. The system of claim 30 wherein the stator comprises a stationary magnetic coupling structure.

32. The system of claim 30 wherein the rotor comprises a ring magnet system.

33. The system of claim 30 wherein the rotor comprises an armature.

34. The system of claim 30 wherein the rotor comprises a coil.

35. The system of claim 30 wherein the stator comprises a coil.

36. The system of claim 28 wherein the internal rotary turbine generates rotation at a shaft coupled to the generator and the generator generates AC current.

37. A heat engine system comprising:
at least one heat engine comprising at least one capillary-pumped heat pipe;
a generator assembly comprising an expander and a generator;
a magnetic coupling to couple the expander to the generator, the magnetic coupling including a first rotating member within the at least one heat pipe and a second rotating member outside the at least one heat pipe and magnetically coupled to the first rotating member;
wherein the at least one heat pipe contains a working fluid and comprises an evaporator section and a condenser section;
wherein the expander is installed within the at least one heat pipe between the evaporator section and the condenser section;
wherein the at least one heat pipe has a capillary structure with a first capillary region adjacent the evaporator section having a first feature size and a second capillary region adjacent the condenser section having a second feature size; and
wherein for at least one heat pipe the first feature size is smaller than the second feature size;
so that the capillary structure supports a pressure differential between the evaporator section and the condenser section to facilitate high-efficiency operation of the heat engine with the working fluid in vapor phase performing useful work through the expander.

* * * * *